(12) United States Patent
Kamada et al.

(10) Patent No.: US 9,267,598 B2
(45) Date of Patent: Feb. 23, 2016

(54) AUTOMATIC TRANSMISSION CONTROL METHOD, CONTROL DEVICE, AND AUTOMATIC TRANSMISSION SYSTEM

(71) Applicant: MAZDA MOTOR CORPORATION, Hiroshima (JP)

(72) Inventors: Shinya Kamada, Kure (JP); Masaru Nakagishi, Hiroshima (JP); Koshiro Saji, Hiroshima (JP); Shotaro Nagai, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/395,946

(22) PCT Filed: Mar. 6, 2013

(86) PCT No.: PCT/JP2013/001422
§ 371 (c)(1),
(2) Date: Oct. 21, 2014

(87) PCT Pub. No.: WO2013/161153
PCT Pub. Date: Oct. 31, 2013

(65) Prior Publication Data
US 2015/0051800 A1    Feb. 19, 2015

(30) Foreign Application Priority Data

Apr. 23, 2012  (JP) ................. 2012-097744

(51) Int. Cl.
*F16H 61/00*   (2006.01)
*F16H 61/04*   (2006.01)
(Continued)

(52) U.S. Cl.
CPC .......... *F16H 61/0437* (2013.01); *F16D 25/063* (2013.01); *F16D 25/0638* (2013.01);
(Continued)

(58) Field of Classification Search
None
See application file for complete search history.

(56) References Cited

U.S. PATENT DOCUMENTS 5,107,723 A *  4/1992  Yamashita et al. ............ 477/117
5,439,427 A    8/1995  Enokido et al.
(Continued)

FOREIGN PATENT DOCUMENTS

CN    1077163 A    10/1993
CN    1118315 A    3/1996
(Continued)

OTHER PUBLICATIONS

International Search Report; PCT/JP2013/001422; Jun. 18, 2013.
(Continued)

*Primary Examiner* — Dirk Wright
(74) *Attorney, Agent, or Firm* — Studebaker & Brackett PC

(57) ABSTRACT

A control method for an automatic transmission in which a starting gear shift stage is attained by fastening a predetermined brake element and a predetermined clutch element includes a step of supplying, when a command, which is for fastening the predetermined brake element and the predetermined clutch element that is to be fastened to input output rotation on an engine side to a transmission mechanism, and which is also for attaining the starting gear shift stage is detected, hydraulic pressure to the clutch element and then fastening the clutch element, and a step of supplying, after the step, the hydraulic pressure to the brake element to start the fastening of the brake element and controlling rotation, which is input to the transmission mechanism, to a target number of rotations. It is possible to satisfactorily attain the starting gear shift stage without a shock while dispensing with a one-way clutch.

17 Claims, 15 Drawing Sheets

(51) Int. Cl.
*F16D 25/0638* (2006.01)
*F16H 61/06* (2006.01)
*F16D 25/063* (2006.01)
*F16D 48/02* (2006.01)

(52) U.S. Cl.
CPC .............. *F16H61/04* (2013.01); *F16H 61/061* (2013.01); *F16D 2048/0212* (2013.01); *F16H 2061/0488* (2013.01)

(56) References Cited

U.S. PATENT DOCUMENTS

| | | | |
|---|---|---|---|
| 5,577,978 A | | 11/1996 | Stasik et al. |
| 5,704,873 A | * | 1/1998 | Iwata et al. .................... 477/115 |
| 5,741,201 A | * | 4/1998 | Tsutsui et al. ................ 477/116 |
| 5,749,805 A | * | 5/1998 | Shimada et al. .............. 477/116 |
| 5,813,941 A | * | 9/1998 | Jang ................................ 477/116 |
| 5,860,886 A | * | 1/1999 | Kim ................................ 475/128 |
| 5,876,303 A | * | 3/1999 | Yu .................................. 477/116 |
| 5,938,563 A | * | 8/1999 | Nishio et al. .................. 477/117 |
| 6,039,673 A | * | 3/2000 | Mikami et al. ................. 477/93 |
| 6,183,393 B1 | * | 2/2001 | Habeck .......................... 477/117 |
| 6,746,355 B2 | * | 6/2004 | Shin et al. ...................... 475/119 |
| 6,843,754 B2 | * | 1/2005 | Mori et al. ....................... 477/92 |
| 7,146,262 B2 | * | 12/2006 | Matsubara et al. ............. 701/51 |
| 8,083,641 B2 | * | 12/2011 | Popp et al. ..................... 477/130 |
| 8,262,527 B2 | * | 9/2012 | Shimizu et al. ............... 475/134 |
| 2007/0060439 A1 | | 3/2007 | Kamada et al. |
| 2007/0099742 A1 | | 5/2007 | Kamada et al. |
| 2008/0113845 A1 | | 5/2008 | Kamada et al. |

FOREIGN PATENT DOCUMENTS

| | | |
|---|---|---|
| CN | 1932337 A | 3/2007 |
| CN | 101182872 A | 5/2008 |
| JP | 2003-148515 A | 5/2003 |
| JP | 2005-036934 A | 2/2005 |
| JP | 2005-265063 A | 9/2005 |
| JP | 2007-127186 A | 5/2007 |
| JP | 2007-239813 A | 9/2007 |

OTHER PUBLICATIONS

The First Office Action issued by the Chinese Patent Office on Sep. 1, 2015, which corresponds to Chinese Patent Application No. 201380021246.0 and is related to U.S. Appl. No. 14/395,946; with English language summary.

* cited by examiner

FIG.2

| | LOW CLUTCH (10) | HIGH CLUTCH (20) | L-R BRAKE (70) | 2-6 BRAKE (80) | R-3-5 BRAKE (90) |
|---|---|---|---|---|---|
| FIRST GEAR SPEED | ◯ | | ◯ | | |
| SECOND GEAR SPEED | ◯ | | | ◯ | |
| THIRD GEAR SPEED | ◯ | | | | ◯ |
| FOURTH GEAR SPEED | ◯ | ◯ | | | |
| FIFTH GEAR SPEED | | ◯ | | | ◯ |
| SIXTH GEAR SPEED | | ◯ | | ◯ | |
| Rev | | | ◯ | | ◯ |

FIG.15

| | LOW CLUTCH (510) | HIGH CLUTCH (520) | L-R BRAKE (570) | 2-6 BRAKE (580) | R-3-5 BRAKE (590) |
|---|---|---|---|---|---|
| M1 SPEED | ○ | | ○ | | |
| D1 SPEED | ○ | | | | |
| SECOND GEAR SPEED | ○ | | | ○ | |
| THIRD GEAR SPEED | ○ | | | | ○ |
| FOURTH GEAR SPEED | ○ | ○ | | | |
| FIFTH GEAR SPEED | | ○ | | | ○ |
| SIXTH GEAR SPEED | | ○ | | ○ | |
| Rev | | | ○ | | ○ |

AUTOMATIC TRANSMISSION CONTROL METHOD, CONTROL DEVICE, AND AUTOMATIC TRANSMISSION SYSTEM

TECHNICAL FIELD

The present invention relates to a control method and a control device for an automatic transmission mounted on a vehicle and an automatic transmission system, and belong to the technical filed of automatic transmissions for vehicles.

BACKGROUND ART

An automatic transmission mounted on a vehicle is configured to combine a torque converter and a transmission mechanism and selectively fasten a plurality of friction elements such as a clutch and a brake according to an operation state to thereby change an actuation state of the transmission mechanism, that is, a power transmission route and automatically change gear to a predetermined gear shift stage.

For example, Patent Literature 1 discloses an automatic transmission in which a low reverse brake and a one-way clutch are arranged in parallel and, in forward first gear speed, only a low clutch, which is fastened to input output rotation on an engine side to a transmission mechanism, is fastened, whereby the one-way clutch is locked to form a power transmission route of the forward first gear speed. Note that Patent Literature 1 mentions that the low reverse brake is fastened in reverse speed and is fastened even in the forward first gear speed if an engine brake is necessary when stepping of an accelerator pedal is released and the engine side is reversely driven from a wheel side.

However, since the one-way clutch is provided, the cost, the weight, and the size of the automatic transmission increase. Moreover, in gear shift stages other than a starting gear shift stage, since the one-way clutch idles without being locked, drag resistance occurs and deterioration in fuel efficiency is caused. Therefore, it is proposed to dispense with the one-way clutch and, in the forward first gear speed, always fasten the low clutch and the low reverse brake. However, Patent Literature 1 does not disclose a specific fastening operation in that case. Instead, Patent Literature 1 describes the influence of centrifugal hydraulic pressure in fastening the low clutch. That is, since the low clutch is fastened to input output rotation on the engine side to the transmission mechanism, the low clutch is always rotating with the output rotation on the engine side during the operation of the engine. According to this rotation, hydraulic oil in a hydraulic pressure chamber of the low clutch receives a centrifugal force and the pressure of the hydraulic oil rises. This pressure rise affects fastening control for the low clutch. Therefore, Patent Literature mentions that a balance chamber is partitioned on an opposite side of a hydraulic chamber of a piston and the hydraulic oil is supplied to the balance chamber as well, whereby the influence of the centrifugal hydraulic pressure is offset.

Incidentally, since the starting gear shift stage has a large reduction ratio, an unpleasant shock tends to occur if timing of the fastening of the low clutch deviates. Therefore, it is more important to eliminate the influence of the centrifugal hydraulic pressure. However, under the current situation, the influence of the centrifugal hydraulic pressure cannot be sufficiently eliminated simply by providing the balance chamber.

CITATION LIST

Patent Literature

Patent Literature 1: Japanese Patent Application Laid-open No. 2007-127186 (paragraph 0047, paragraph 0052, FIG. 2, and FIG. 5)

SUMMARY OF INVENTION

Therefore, it is an object of the present invention to provide a control method and a control device for an automatic transmission and an automatic transmission system capable of satisfactorily attaining, in an automatic transmission in which a starting gear shift stage is attained by fastening a predetermined brake element and a predetermined clutch element, the starting gear shift stage without a shock while dispensing with a one-way clutch.

That is, the present invention is a control method for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch, the control method including: a command detecting step of detecting a command for, from a state in which the clutch element and the brake element are released and in which transmission of power is not performed between an engine side and a wheel side of the transmission mechanism, fastening the friction elements to attain the starting gear shift stage (hereinafter referred to as "starting gear shift stage attainment command"); a clutch element fastening step of supplying, when the command is detected in the command detecting step, hydraulic pressure to the clutch elements thereby fastening the clutch elements; and a rotation control step of supplying, after the clutch element fastening step, the hydraulic pressure to the brake elements to thereby start the fastening of the brake elements and controlling rotation, which is input to the transmission mechanism via the clutch elements.

The present invention is a control device for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch, the control device including: a command detecting unit for detecting a command for, from a state in which the clutch element and the brake element are released and in which transmission of power is not performed between an engine side and a wheel side of the transmission mechanism, fastening the friction elements to attain the starting gear shift stage; a clutch element fastening unit for supplying, when the command is detected by the command detecting unit, hydraulic pressure to the clutch elements thereby fastening the clutch elements; and a rotation control unit for supplying, after the operation of the clutch element fastening unit, the hydraulic pressure to the brake elements thereby starting the fastening of the brake elements and controlling rotation, which is input to the transmission mechanism via the clutch elements.

In another aspect, the present invention is a control device for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch, the control device including: a command detecting unit for detecting a command for, from a state in which the clutch element and the brake element are released and in which transmission of power is not performed between an engine side and a wheel side of the transmission mechanism, fastening the friction elements to attain the starting gear shift stage; a clutch element fastening unit for supplying, when the command is detected by the command detecting unit, hydraulic pressure to the clutch elements thereby fastening the clutch elements; and a brake element fastening unit for supplying, after the operation of the clutch element fastening unit, the hydraulic pressure to the brake elements thereby starting the fastening of the brake elements.

According to the present invention, it is possible to satisfactorily attain a starting gear shift stage such as forward first gear speed or reverse speed by fastening the predetermined brake element and the predetermined clutch element without a shock while dispensing with a one-way clutch.

The above and other objects, features, and advantages of the present invention will be made apparent from the following detailed description and the accompanying drawings.

BRIEF DESCRIPTION OF DRAWINGS

FIG. 2 is a fastening table of the automatic transmission.

FIG. 15 is a fastening table of the automatic transmission according to the third embodiment.

DESCRIPTION OF EMBODIMENTS

Figure 1:
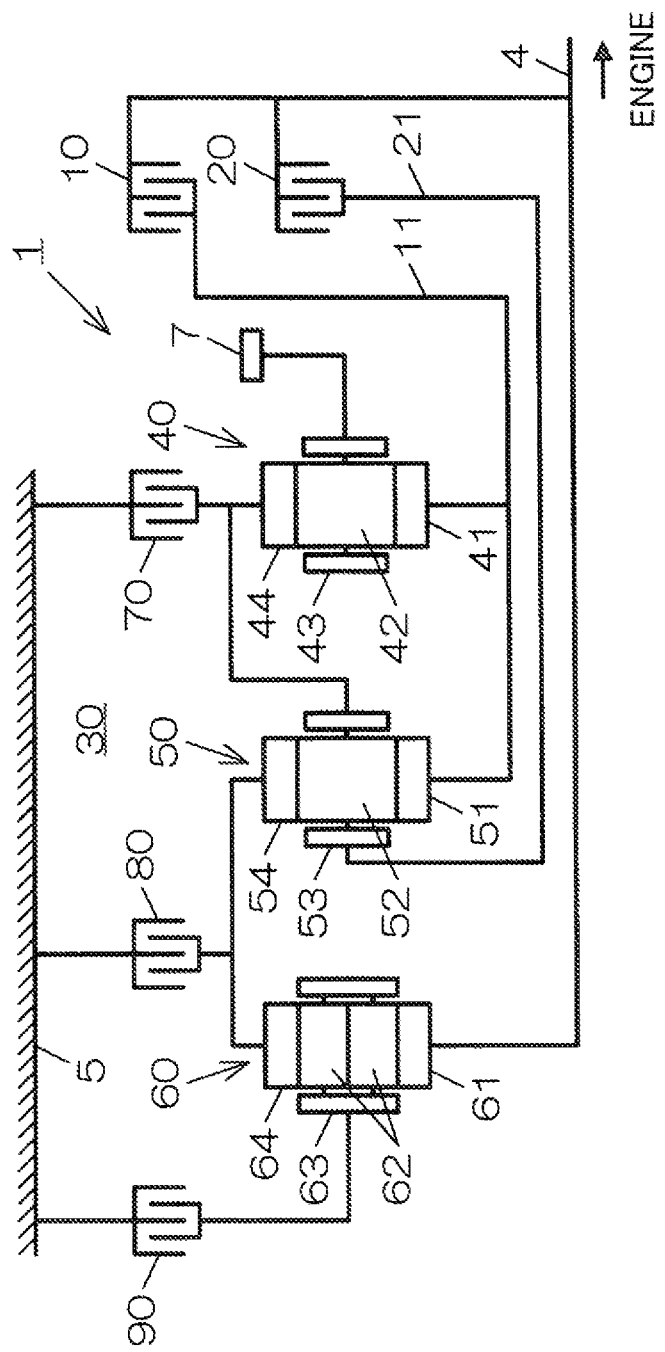
FIG. 1 is a main point diagram of an automatic transmission according to a first embodiment of the present invention.

Embodiments of the present invention are explained below with reference to the drawings.

First Embodiment

First, a first embodiment is explained with reference to FIG. 1 to FIG. 9. In this embodiment, the present invention is applied to an automatic transmission 1 shown in FIG. 1.

The automatic transmission 1 is mounted on a transverse engine automobile such as a front-engine front-drive car. The automatic transmission 1 includes a torque converter (not shown in the figure) attached to an engine output shaft and a transmission mechanism 30 to which output rotation of an engine is input via the torque converter.

Routes provided as routes on which the output rotation of the engine is input to the transmission mechanism 30, as explained below in detail, are a route on which the output rotation is directly input from an input shaft (a turbine shaft) 4 to a sun gear 61 of a third planetary gear set (hereinafter, the planetary gear set is abbreviated as "PGS") 60, a route on which the output rotation is input from the input shaft 4 to a sun gear 41 of a first PGS 40 and a sun gear 51 of a second PGS 50 through a first clutch 10 and an output member 11, and a route on which the output rotation is input from the input shaft 4 to a pinion carrier 53 of the second PGS 50 through a second clutch 20 and an output member 21.

The output rotation of the transmission mechanism 30 is extracted from an output gear 7. The output gear 7 is coupled to a pinion carrier 43 of the first PGS 40. The rotation extracted from the output gear 7 is transmitted to a differential device (not shown in the figure) via a counter drive mechanism and drives left and right wheels.

The first clutch 10, the second clutch 20, the first PGS 40, the second PGS 50, the third PGS 60, and the output gear 7 are coaxially arranged side by side on a shaft core of the input shaft 4 and are housed in a transmission case 5 in that state.

The transmission mechanism 30 includes the first, second, and third PGSs 40, 50, and 60 that configure the power transmission routes. The first, second, and third PGSs 40, 50, and 60 are arranged adjacent to one another in the axial direction from the engine side in this order.

The transmission mechanism 30 includes, as friction elements, the first clutch (a low clutch) 10, the second clutch (a high clutch) 20, a first brake (a low reverse brake (L-R brake)) 70, a second brake (2-6 brake) 80, and a third brake (R-3-5 brake) 90. The first and second clutches 10 and 20 are arranged to overlap in the axial direction, that is, side by side in the radial direction. The first and second clutches 10 and 20 and the first, second, and third brakes 70, 80, and 90 are arranged in the axial direction from the engine side in this order.

The first and second PGSs 40 and 50 are single pinion PGSs and the third PGS 60 is a double pinion PGS. The PGSs 40, 50, and 60 include the sun gears 41, 51, and 61, pinions 42, 52, and 62 that mesh with the sun gears 41, 51, and 61, the pinion carriers 43, 53, and 63 that support the pinions 42, 52, and 62, and internal gears 44, 54, and 64 that mesh with the pinions 42, 52, and 62.

Next, a coupling relation of the constituent elements of the transmission mechanism 30 and a coupling relation between the constituent elements of the transmission mechanism 30 and the input shaft 4 and the output gear 7 are explained.

The sun gear 41 of the first PGS 40 and the sun gear 51 of the second PGS 50 are coupled. The internal gear 44 of the first PGS 40 and the pinion carrier 53 of the second PGS 50 are coupled. The internal gear 54 of the second PGS 50 and the internal gear 64 of the third PGS 60 are coupled.

The coupled sun gears 41 and 51 are coupled to the output member 11 of the first clutch 10 and disconnectably coupled to the input shaft 4 via the first clutch 10. The coupled internal gear 44 and pinion carrier 53 are coupled to the output member 21 of the second clutch 20 and disconnectably coupled to the input shaft 4 via the second clutch 20.

The coupled internal gear 44 and pinion carrier 53 are disconnectably coupled to the transmission case 5 via the first brake 70. The coupled internal gears 54 and 64 are disconnectably coupled to the transmission case 5 via the second brake 80. The pinion carrier 63 of the third PGS 60 is disconnectably coupled to the transmission case 5 via the third brake 90.

The sun gear 61 of the third PGS 60 is directly coupled to the input shaft 4. The pinion carrier 43 of the first PGS 40 is directly coupled to the output gear 7.

According to the coupling relation explained above, in the automatic transmission 1 according to this embodiment, as shown in a fastening table of FIG. 2, fastening states of the first and second clutches 10 and 20 and the first, second, and third brakes 70, 80, and 90 are switched, whereby forward six stages and reverse speed (Rev) are attained. In the fastening table of FIG. 2, circles indicate that the clutches and the brakes are fastened.

In forward first gear speed, the first clutch (the low clutch) 10 and the first brake (the low reverse brake) 70 are fastened. That is, the first clutch 10 is a predetermined clutch element (more specifically, a predetermined clutch element fastened to input output rotation on the engine side to the transmission mechanism) in claims. The first brake 70 is a predetermined brake element in claims. The rotation of the input shaft 4 is input to the sun gear 41 of the first PGS 40. The input rotation is reduced in speed at a large reduction ratio by the first PGS 40 and thereafter extracted to the output gear 7 from the pinion carrier 43 of the first PGS 40.

In forward second gear speed, the first clutch 10 and the second brake (the 2-6 brake) 80 are fastened. The rotation of the input shaft 4 is input to the sun gear 41 of the first PGS 40 and input to the internal gear 44 of the first PGS 40 via the pinion carrier 53 of the second PGS 50. The input rotation is reduced in speed at a reduction ratio smaller than the first gear speed and thereafter extracted to the output gear 7 from the pinion carrier 43 of the first PGS 40.

In forward third gear speed, the first clutch 10 and the third brake (the R-3-5 brake) 90 are fastened. The rotation of the input shaft 4 is input to the sun gear 41 of the first PGS 40 and input to the internal gear 44 of the first PGS 40 via the internal gear 64 of the third PGS 60 and the pinion carrier 53 of the second PGS 50. The input rotation is reduced in speed at a reduction ratio still smaller than the second gear speed and thereafter extracted to the output gear 7 from the pinion carrier 43 of the first PGS 40.

In forward fourth gear speed, the first clutch 10 and the second clutch (the high clutch) 20 are fastened. The rotation of the input shaft 4 is input to the sun gear 41 of the first PGS 40 and input to the internal gear 44 of the first PGS 40 via the pinion carrier 53 of the second PGS 50 (not reduced in speed). The input rotation rotates the entire first PGS 40 integrally with the input shaft 4. Therefore, rotation at a reduction ratio 1 is extracted to the output gear 7 from the pinion carrier 43 of the first PGS 40.

In forward fifth gear speed, the second clutch 20 and the third brake 90 are fastened. The rotation of the input shaft 4 is input to the sun gear 41 of the first PGS 40 via the internal gear 64 of the third PGS 60 and the sun gear 51 of the second PGS 50 and is input to the internal gear 44 of the first PGS 40 via the pinion carrier 53 of the second PGS 50 (not reduced in speed). The input rotation is increased in speed and thereafter extracted to the output gear 7 from the pinion carrier 43 of the first PGS 40.

In forward sixth gear speed, the second clutch 20 and the second brake 80 are fastened. The rotation of the input shaft 4 is input to the sun gear 41 of the first PGS 40 via the sun gear 51 of the second PGS 50 and input to the internal gear 44 of the first PGS 40 via the pinion carrier 53 of the second PGS 50 (not reduced in speed). The input rotation is increased in speed at a speed increasing ratio larger than the fifth gear speed and thereafter extracted to the output gear 7 from the pinion carrier 43 of the first PGS 40.

In reverse speed, the first brake 70 and the third brake 90 are fastened. The rotation of the input shaft 4 is input to the sun gear 41 of the first PGS 40 via the internal gear 64 of the third PGS 60 and the sun gear 51 of the second PGS 50. The input rotation is reversed in a rotating direction by the second PGS 50. The input rotation is reduced in speed at a large reduction ratio by the first PGS 40 and extracted to the output gear 7 from the pinion carrier 43 of the first PGS 40 as rotation in the opposite direction of the rotating direction of the input shaft 4.

As explained above, in the automatic transmission 1 according to this embodiment, the transmission mechanism 30 includes the three PGSs 40, 50, and 60, the two clutches 10 and 20, and the three brakes 70, 80, and 90. The clutches 10 and 20 and the brakes 70, 80, and 90 are selectively fastened, whereby the power transmission routes of the PGS 40, 50 and 60 are switched and the forward six stages and the reverse speed are attained. That is, the automatic transmission 1 according to this embodiment includes a plurality of friction elements 10, 20, 70, 80, and 90 that change a power transmission route of the transmission mechanism 30 according to an operation state.

Figure 3:
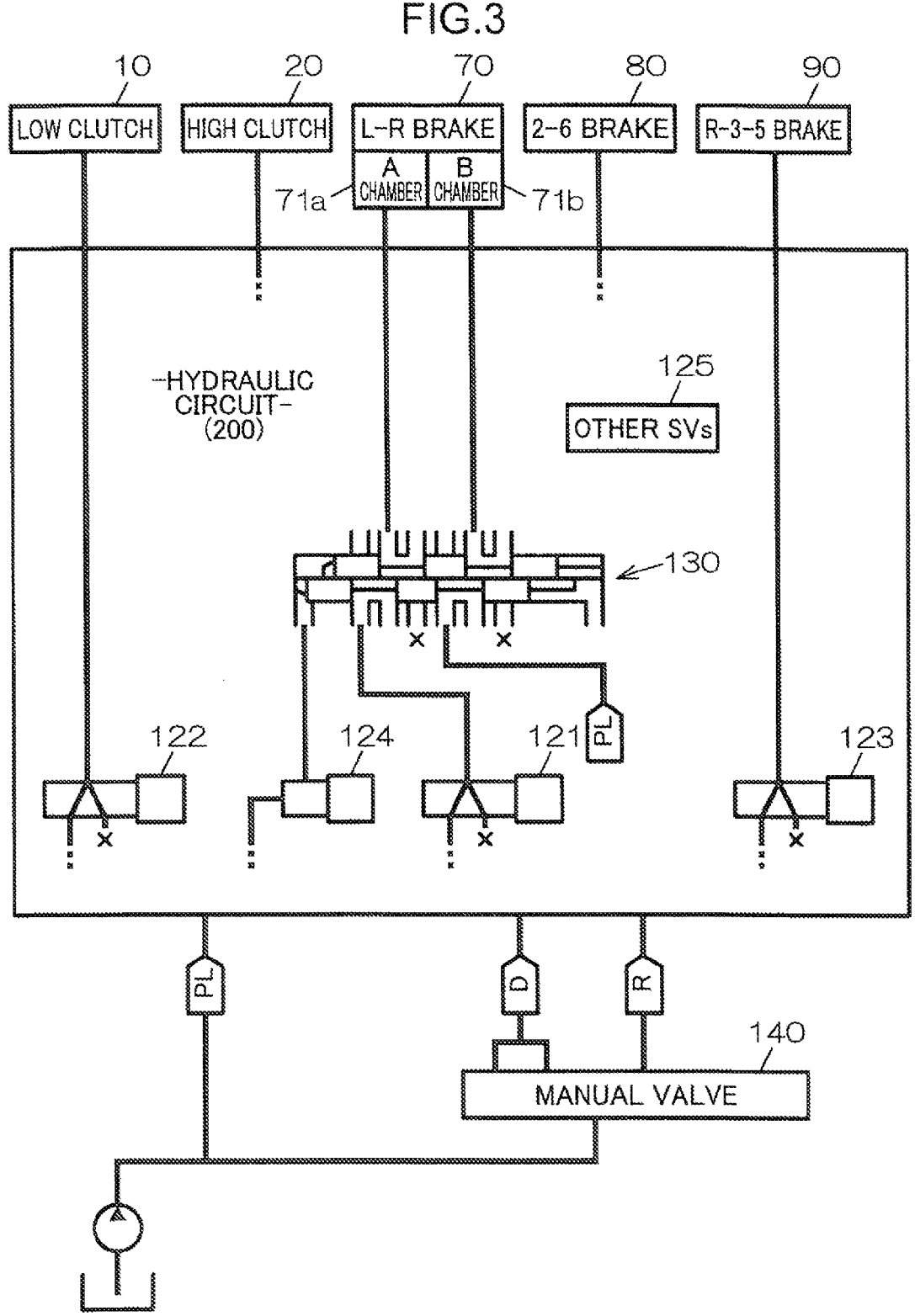
FIG. 3 is a block diagram showing hydraulic routes from an oil pump of the automatic transmission to friction elements.

As shown in FIG. 3, in this embodiment, hydraulic pressure discharged from an oil pump is adjusted to predetermined line pressure (in the figure, indicated by "PL") by a regulator valve (not shown in the figure) and thereafter always supplied to a hydraulic circuit 200 via a predetermined oil path. Further, when a D range or an R range is selected via a manual valve 140, the hydraulic pressure is supplied to the hydraulic circuit 200 via another predetermined oil path.

The hydraulic circuit 200 includes a first linear solenoid valve (hereinafter, the solenoid valve is referred to as "SV") 121 for supplying the hydraulic pressure to an A chamber 71a (a second hydraulic chamber) of the low reverse brake 70, a second linear SV 122 for supplying the hydraulic pressure to a hydraulic chamber of the low clutch 10, a third linear SV 123 for supplying the hydraulic pressure to a hydraulic chamber of the R-3-5 brake 90, other SVs 125 for, for example, supplying the hydraulic pressure to hydraulic chambers of other friction elements, a shift valve 130 for communicating or shutting off the first linear SV 121 and the A chamber 71a of the low reverse brake 70 and communicating or shutting off a predetermined line pressure supply oil path and a B chamber 71b (a first hydraulic chamber) of the low reverse brake 70, and an ON/OFF SV 124 for switching the position of a spool of the shift valve 130. The SVs 121 to 125 are a hydraulic control valve in claims.

Since the ON/OFF SV 124 is a normal open type, in a non-energized state (off), the ON/OFF SV 124 outputs the hydraulic pressure and locates the spool of the shift valve 130 on the right side with respect to FIG. 3. On the other hand, since the linear SVs 121 to 123 are a normal close type, in the non-energized state (off), the linear SVs 121 to 123 do not supply the hydraulic pressure to the friction elements 70, 10, and 90 corresponding thereto.

Figure 4:
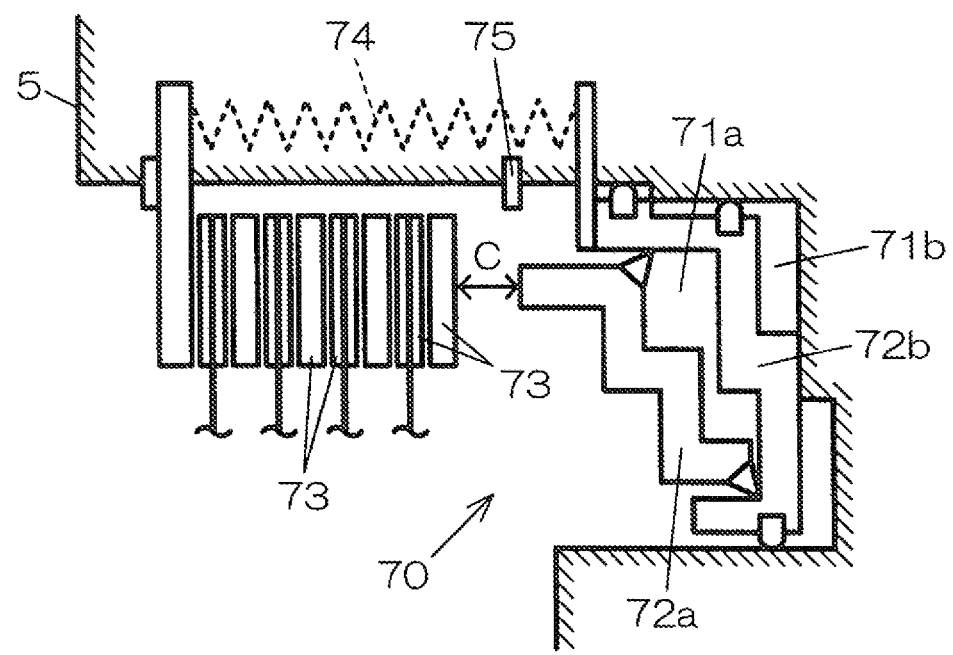
FIG. 4 is a sectional view showing the structure of a low reverse brake (L-R brake) of the automatic transmission.

As shown in FIG. 4, in this embodiment, the low reverse brake 70 includes the two hydraulic chambers (the A chamber 71a and the B chamber 71b) and two pistons (a piston 72a for the A chamber and a piston 72b for the B chamber). The piston 72b for the B chamber is configured to be capable of stroking in the transmission case 5 while receiving an urging force of a return spring 74. The piston 72a for the A chamber is configured to be capable of stroking in the piston 72b for the B chamber without receiving the urging force of the return spring 74. The piston 72a for the A chamber presses a plurality of friction plates 73 . . . 73.

Hydraulic pressure necessary for moving the piston 72b for the B chamber over a distance C between the piston 72a for the A chamber and the friction plate 73, that is, to a position where there is no clearance is supplied to the B chamber 71b. Specifically, since line pressure is supplied to the B chamber 71b, the B chamber 71b moves the piston 72b for the B chamber resisting an urging force of the return spring 74 from a state in which the low reverse brake 70 is released (a state in which the clearance C is relatively large) to a state immediately before fastening is started (a state in which the clearance C is zero, that is, a slip state). Note that, according to the movement of the piston 72b for the B chamber, the piston 72a for the A chamber housed in the piston 72b for the B chamber also moves. However, as explained below, when the necessary hydraulic pressure is not supplied to the A chamber 71a, the piston 72a for the A chamber does not have a pressing force enough for pushing the friction plate 73 to the fastening side even if the piston 72a for the A chamber comes into contact with the friction plate 73 and the clearance decreases to zero. A stopper 75 for regulating further movement of the piston 72b for the B chamber to the fastening side is disposed in the transmission case 5.

On the other hand, hydraulic pressure necessary for generating a pressing force necessary for fastening the low reverse brake 70 is supplied to the A chamber 71a via the piston 72a for the A chamber. Specifically, since hydraulic pressure is supplied to the A chamber 71a, the A chamber 71a moves the piston 72a for the A chamber without resisting an urging force of the return spring from a state immediately before the low reverse brake 70 starts fastening to a state in which the low reverse brake 70 completes the fastening (a state in which the rotation of the friction plate 73 on a side (a driving side) on which the piston 72a for the A chamber is stopped).

Figure 5:
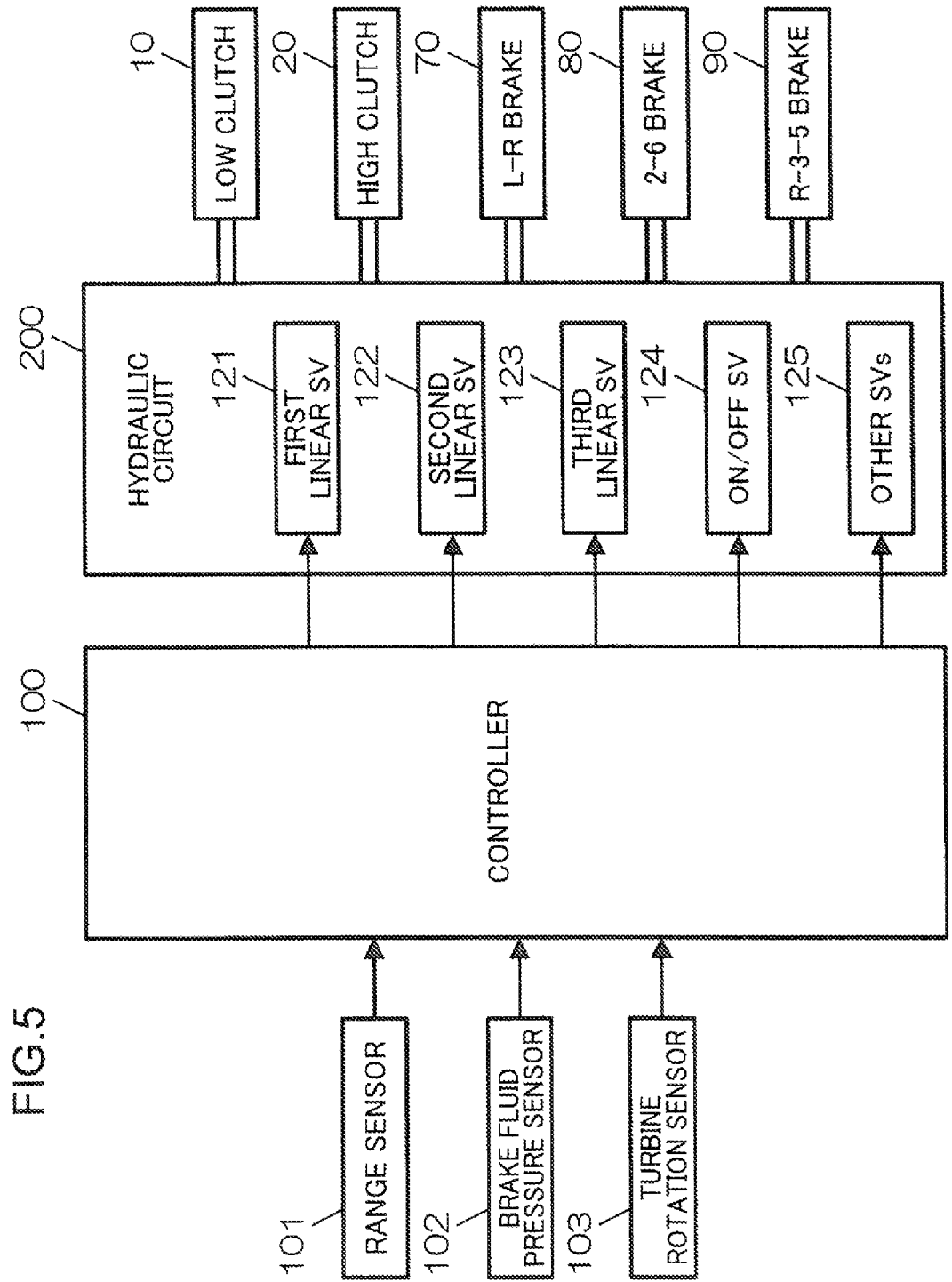
FIG. 5 is a control system diagram of the automatic transmission.

As shown in FIG. 5, in this embodiment, a controller 100 is provided that receives a signal from a range sensor 101 that detects a selected range, a signal from a brake fluid pressure sensor 102 that detects brake fluid pressure that reflects a stepping amount of a brake pedal, and a signal from a turbine rotation sensor 103 that detects rotation (turbine rotation) of the input shaft (the turbine shaft) 4, and controls, on the basis of these signals, various SVs (hydraulic control valves) 121 to 125 included in the hydraulic circuit 200 to thereby selectively fasten the friction elements 10, 20, 70, 80, and 90 and attain the forward six stages and the reverse speed.

Although not shown in the figure in detail, in the friction elements 10, 20, 70, 80, and 90, hydraulic actuators that drive the friction elements 10, 20, 70, 80, and 90 are respectively provided. Specifically, the hydraulic actuators are pistons driven according to supply and discharge of the hydraulic pressure (the pistons 72a and 72b of the low reverse brake 70 are shown in FIG. 4). The controller 100 controls the various SVs (hydraulic control valves) 121 to 125 to supply the hydraulic pressure to the hydraulic actuators of the friction elements 10, 20, 70, 80, and 90 and discharge the hydraulic pressure from the hydraulic actuators of the friction elements 10, 20, 70, 80, and 90.

Figure 6:
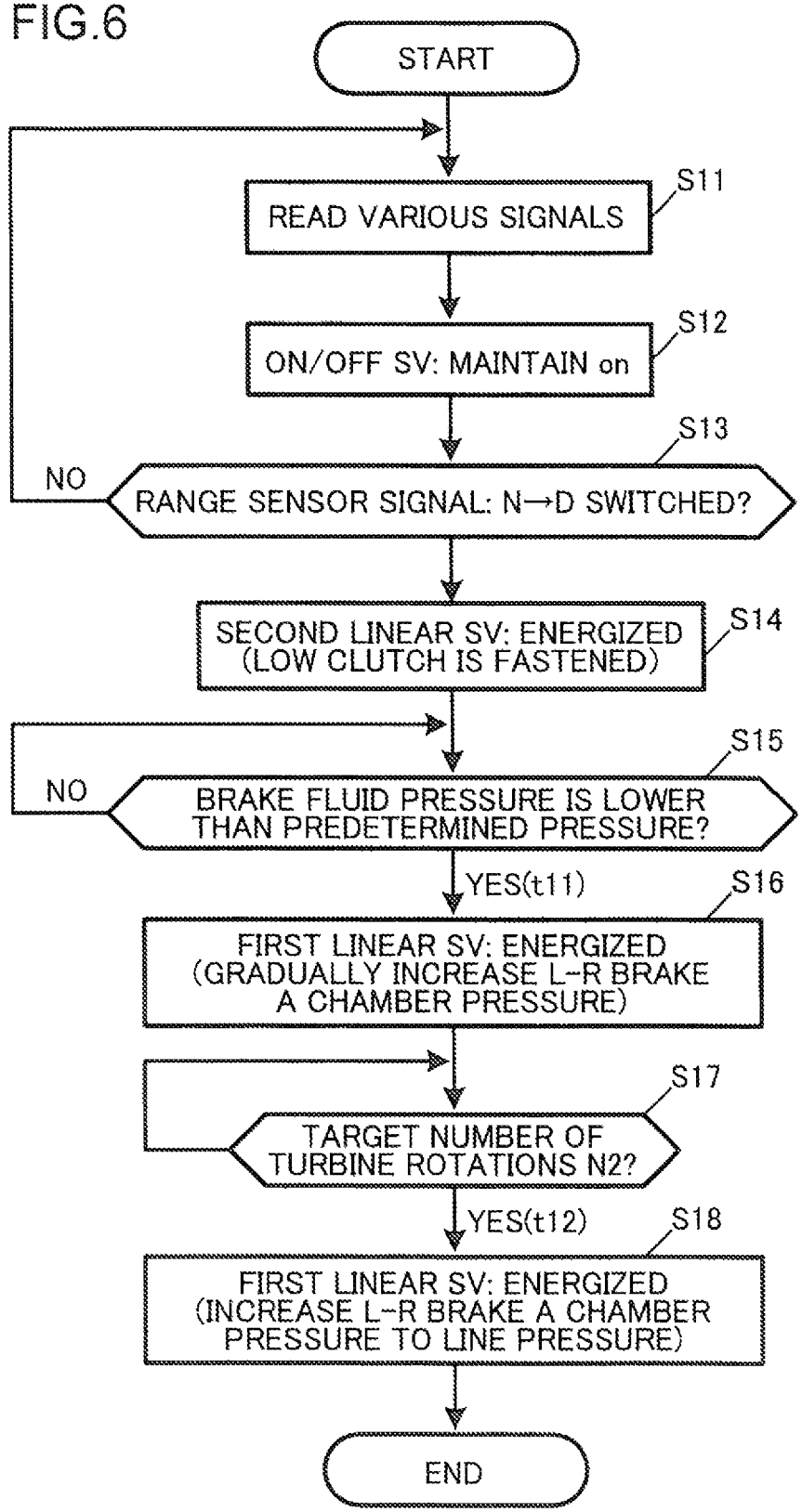
FIG. 6 is a flowchart of a control operation (a first control operation) performed by a controller of the automatic transmission.
Figure 7:
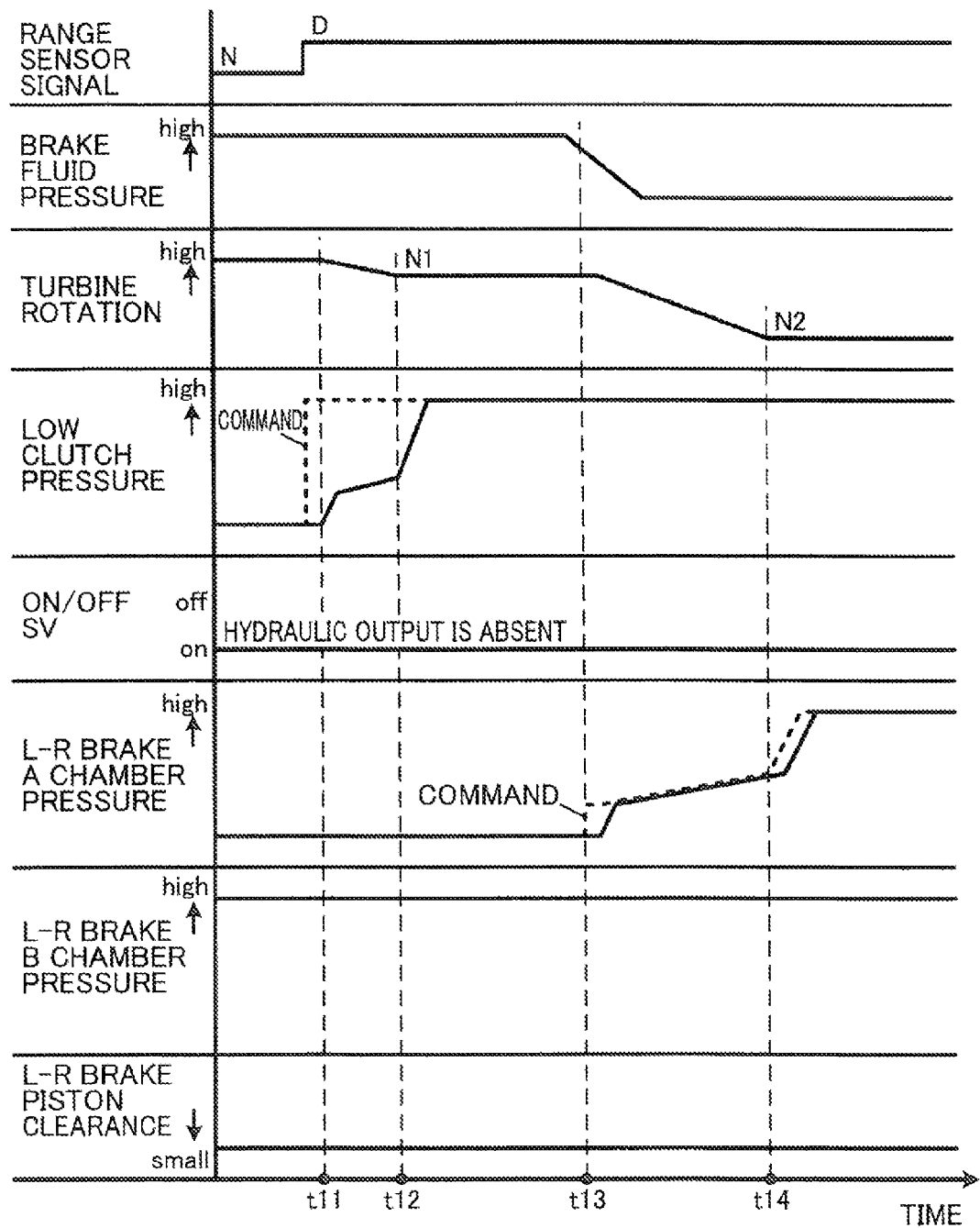
FIG. 7 is a time chart in the case in which the controller performs the first control operation.

Next, a control operation (a first control operation) performed by the controller 100 is explained according to a flowchart shown in FIG. 6 and a time chart shown in FIG. 7. This control operation is a control operation performed when, from a state in which the low clutch 10 and a low reverse brake 70 are released and transmission of power is not performed between the engine side and the wheel side of the transmission mechanisms 30, the low clutch 10 and the low reverse brake 70 are fastened to attain the forward first gear speed.

First, this control is started in a state in which the low clutch 10 and the low reverse brake 70 are released. In step S11, the controller 100 reads various signals from the sensors 101 to 103. Thereafter, in step S12, the controller 100 maintains the ON/OFF SV 124 in an energized state (on). Consequently, the ON/OFF SV 124 of the normal open type does not output the hydraulic pressure (hydraulic pressure output is absent). The spool of the shift valve 130 is located on the left side with respect to FIG. 3 (the spool of the shift valve 130 is always urged to the left side with respect to FIG. 3 by a not-shown return spring). As a result, the first linear SV 121 and the A chamber 71a of the low reverse brake 70 communicate with each other and the predetermined line pressure supply oil path and the B chamber 71b of the low reverse brake 70 communicate with each other. At this point, since the linear SVs 121 to 123 are set in the non-energized state (off), the hydraulic pressure is not supplied to the A chamber 71a and the line pressure is supplied to the B chamber 71b (see "L-R brake A chamber pressure" and "L-R brake B chamber pressure" in FIG. 7). Since the line pressure is supplied to the B chamber 71b, the piston 72b for the B chamber moves to the fastening side until the piston 72b for the B chamber comes into contact with the stopper 75. Therefore, the low reverse brake 70 changes to the state immediately before the fastening is started (the state in which the clearance C is zero, that is, the slip state) (see "L-R brake piston clearance" in FIG. 7).

Subsequently, in step S13, the controller 100 determines according to a signal from the range sensor 101 whether switching from an N range to a D range is performed. As a result, when it is determined YES, in step S14, the controller 100 changes the second linear SV 122 to the energized state. Consequently, the hydraulic pressure (low clutch pressure) is supplied to the hydraulic chamber of the low clutch 10. The low clutch 10 is fastened (finally, the low clutch pressure increases to the line pressure). However, although the low clutch 10 is fastened, transmission of power does not start yet. Therefore, even if it is difficult to precisely control timing of the fastening of the low clutch 10 because of the influence of centrifugal hydraulic pressure, an unpleasant shock does not occur.

Note that, in FIG. 7, a broken line indicates a command from the controller 100 to the second linear SV 122 and a solid line indicates real hydraulic pressure supplied to the hydraulic chamber of the low clutch 10.

A signal from the range sensor 101 indicating the switching from the N range to the D range is a command for, from a state in which the clutch element and the brake element are released and transmission of power is not performed between an engine side and a wheel side of the transmission mechanism, fastening the friction elements to attain the starting gear shift stage, that is, starting gear shift stage attainment command in claims.

The number of turbine rotations at the time when the low clutch 10 is fastened is the number of turbine rotations at the time when the low clutch 10 is fastened and the low reverse brake 70 is in the slip state. Therefore, the above number of turbine rotations is the number of turbine rotations N1 during neutral idle control (control for maintaining at least one of the friction elements, which attain the starting gear shift stage, in the slip state to thereby reduce a load on the engine and attain improvement of fuel efficiency in a period in which a driver selects the D range or the R range but does not request starting yet (e.g., brake hydraulic pressure is equal to or higher than predetermined pressure)).

The number of turbine rotations decreases from a rising edge point t11 of the low clutch pressure to a fastening point t12 of the low clutch 10 and thereafter maintained at the number of turbine rotations N1 during the neutral idle control. That is, the neutral idle control is started at the fastening point t12 of the low clutch 10.

Subsequently, in step S15, the controller 100 determines according to a signal from the brake fluid pressure sensor 102 whether the brake hydraulic pressure is lower than the predetermined pressure (whether the driver requests starting). As a result, when it is determined YES (a point t13), the neutral idle control is ended. In step S16, the controller 100 changes the first linear SV 121 to the energized state. Specifically, as indicated by a broken line (a command) in the "L-R brake A chamber pressure" in FIG. 7, a current value applied to the first linear SV 121 of the normal close type is gradually increased. Consequently, the hydraulic pressure is gradually supplied to the A chamber 71a of the low reverse brake 70 and the fastening of the low reverse brake 70 is started. According to the start of the fastening of the low reverse brake 70, the number of turbine rotations input to the transmission mechanism 30 via the low clutch 10 gradually decreases.

Subsequently, in step S17, the controller 100 determines according to a signal from the turbine rotation sensor 103 whether the number of turbine rotations reaches a predetermined target number of turbine rotations N2. As a result, when it is determined YES (a point t14), rotation control for the number of turbine rotations converged to the target number of rotations N2 is ended. In step S18, the controller 100 maintains the energized state of the first linear SV 121. Specifically, as indicated by the broken line (the command) in the "L-R bake A chamber pressure" in FIG. 7, the controller 100 quickly further increases a current value applied to the first linear SV 121. Consequently, the hydraulic pressure is further supplied to the A chamber 71a of the low reverse brake 70 and increases to the line pressure. The fastening of the low reverse brake 70 is completed.

Note that, in FIG. 7, a broken line indicates a command from the controller 100 to the first linear SV 121 and a solid line indicates real hydraulic pressure supplied to the A chamber 71a of the low reverse brake 70.

As shown in FIG. 4, all of the A chamber 71a, the B chamber 71b, the piston 72a for the A chamber, and the piston 72b for the B chamber of the low reverse brake 70 are provided in the transmission case 5 and do not rotate. Therefore, centrifugal hydraulic pressure does not occur in the low reverse brake 70. Therefore, according to the fastening control of the low reverse brake 70, it is possible to precisely perform rotation control for the number of turbine rotations (control for converging the number of turbine rotations to the target number of turbine rotations N2) without taking into account the influence of centrifugal hydraulic pressure. It is possible to fasten the low reverse brake 70 at satisfactory timing without a shock.

Next, another control operation (a second control operation) performed by the controller 100 is explained with reference to a flowchart shown in FIG. 8 and a time chart shown in FIG. 9. This control operation is also a control operation performed when, from the state in which the low clutch 10 and the low reverse brake 70 are released and transmission of power is not performed between the engine side and the wheel side of the transmission mechanism 30, the low clutch 10 and the low reverse brake 70 are fastened to attain the forward first gear speed. However, the control operation is different from the first control operation as explained below. In the first control operation, the ON/OFF SV 124 is set in the energized state (on) before the starting gear shift stage attainment command is detected, the line pressure is supplied to the B chamber 71b of the low reverse brake 70, and the low reverse brake 70 is set in the slip state immediately before the fastening start. On the other hand, in the second control operation, before the starting gear shift stage attainment command is detected, the ON/OFF SV 124 is set in the non-energized state (off), the line pressure is not supplied to the B chamber 71b of the low reverse brake 70, the low reverse brake 70 is set in the release state, and, after the starting gear shift stage attainment command is detected, the ON/OFF SV 124 is set in the energized state (on), the line pressure is supplied to the B chamber 71b of the brake 70, and the low reverse brake 70 is set in the slip state immediately before the fastening start. The second control operation is explained below while omitting explanation overlapping the first control operation.

First, this control is started in the state in which the low clutch 10 and the low reverse brake 70 are released. In step S21, the controller 100 reads various signals from the sensors 101 to 103. Thereafter, in step S22, the controller 100 maintains the ON/OFF SV 124 in the non-energized state (off). Consequently, the ON/OFF SV 124 of the normal open type outputs the hydraulic pressure (a hydraulic output is present). The spool of the shift valve 130 is located on the right side with respect to FIG. 3. As a result, the first linear SV 121 and the A chamber 71a of the low reverse brake 70 are shut off. The predetermined line pressure supply oil path and the B chamber 71b of the low reverse brake 70 are shut off. Therefore, the hydraulic pressure is not supplied to the A chamber 71a and the line pressure is not supplied to the B chamber 71b (see "L-R brake A chamber pressure" and "L-R brake B chamber pressure" in FIG. 9). At this point, the linear SVs 121 to 123 are set in the non-energized state (off). Since the line pressure is not supplied to the B chamber 71b, the piston 72b for the B chamber moves to the release side with the urging force of the return spring 74. Therefore, the low reverse brake 70 changes to a released state (a state in which the clearance C is relatively large) (see "L-R brake piston clearance" in FIG. 9).

Subsequently, in step S23, the controller 100 determines according to a signal from the range sensor 101 whether switching from the N range to the D range is performed. As a result, when it is determined YES, in step S24, the controller 100 changes the second linear SV 122 to the energized state. Consequently, the hydraulic pressure (low clutch pressure) is supplied to the hydraulic chamber of the low clutch 10 and the low clutch 10 is fastened (finally, the low clutch pressure increases to the line pressure).

Figure 9:
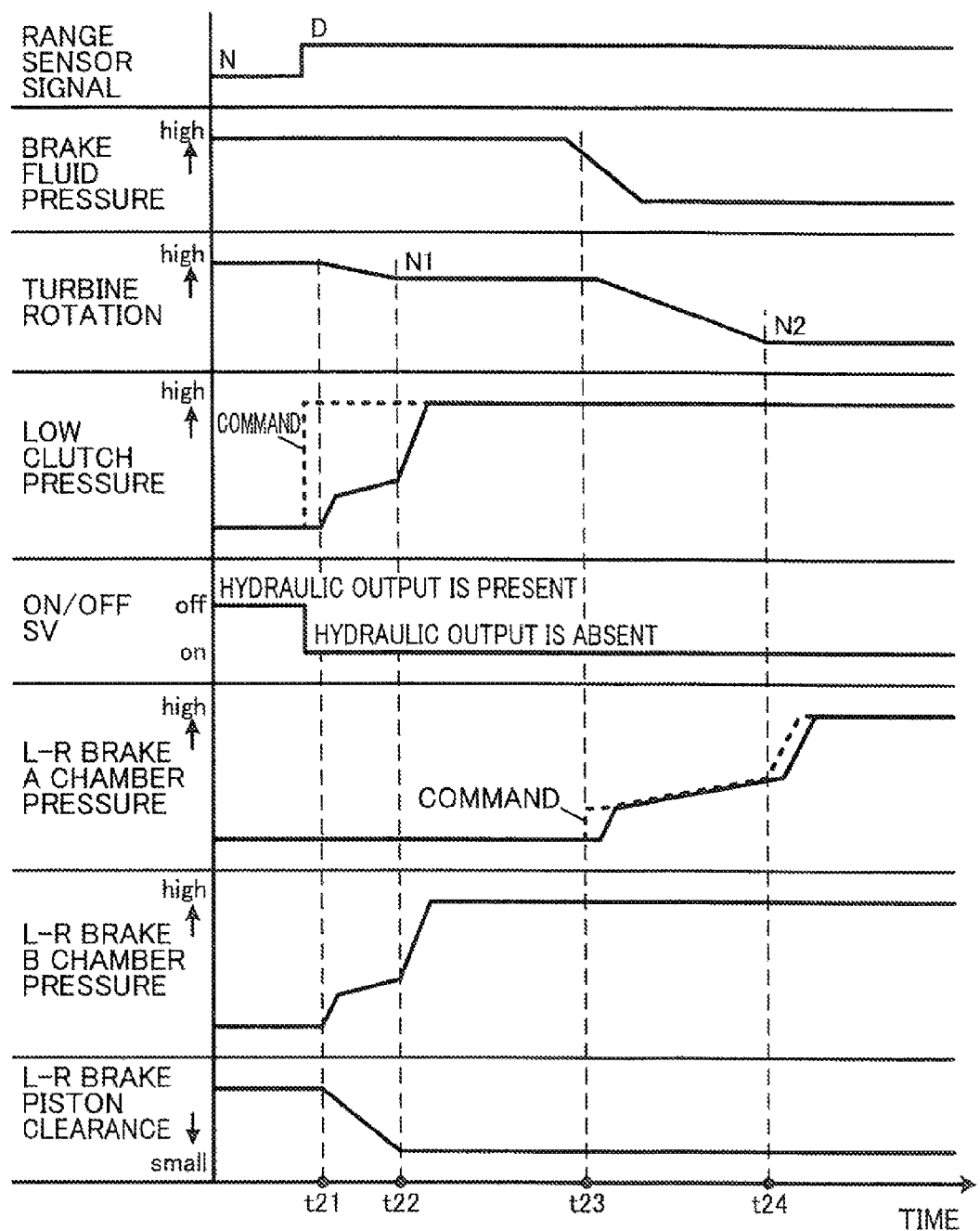
FIG. 9 is a time chart in the case in which the controller performs the second control operation.

Note that, in FIG. 9, a broken line indicates a command from the controller 100 to the second linear SV 122 and a solid line indicates real hydraulic pressure supplied to the hydraulic chamber of the low clutch 10.

In step S25, the controller 100 changes the ON/OFF SV 124 to the energized state (on). Consequently, the ON/OFF SV 124 of the normal open type does not output the hydraulic pressure (a hydraulic output is absent). The spool of the shift valve 130 is located on the left side with respect to FIG. 3. As a result, the first linear SV 121 and the A chamber 71a of the low reverse brake 70 communicate with each other and the predetermined line pressure supply oil path and the B chamber 71*b* of the low reverse brake 70 communicate with each other. Therefore, the line pressure is supplied to the B chamber 71*b* (see "L-R brake B chamber pressure" in FIG. 9). Since the line pressure is supplied to the B chamber 71*b*, the piston 72*b* for the B chamber moves to the fastening side until the piston 72*b* for the B chamber comes into contact with the stopper 75. Therefore, the low reverse brake 70 changes to the state immediately before the fastening is started (the state in which the clearance C is zero, that is, the slip state) (see "L-R brake piston clearance" in FIG. 9).

The number of turbine rotations decreases from a rising edge point of the low clutch pressure (or a rising edge point of the B chamber pressure) t21 to a fastening point of the low clutch 10 (or an end point of movement of the piston 72*b* for the B chamber to the fastening side) t22. Thereafter, the number of turbine rotations is maintained at the number of turbine rotations N1 during the neutral idle control. That is, the neutral idle control is started at the fastening point of the low clutch 10 (or the end point of the movement of the piston 72*b* for the B chamber to the fastening side) t22.

Subsequently, in step S26, the controller 100 determines according to a signal from the brake fluid pressure sensor 102 whether the brake fluid pressures is lower than the predetermined pressure (whether the driver requests starting). As a result, when it is determined YES (at point t23), the neutral idle control is ended. In step S27, the controller 100 changes the first linear SV 121 to the energized state. Specifically, as indicated by a broken line (a command) in "L-R brake A chamber pressure" in FIG. 9, the controller 100 gradually increases a current value applied to the first linear SV 121 of the normal close type. Consequently, the hydraulic pressure is gradually supplied to the A chamber 71*a* of the low reverse brake 70 and the fastening of the low reverse brake 70 is started. According to the fastening start of the low reverse brake 70, the number of turbine rotations input to the transmission mechanism 30 via the low clutch 10 gradually decreases.

Subsequently, in step S28, the controller 100 determines according to a signal from the turbine rotation sensor 103 whether the number of turbine rotations reaches the predetermined target number of turbine rotations N2. As a result, when it is determined YES (a point t24), the rotation control for the number of turbine rotations for converging the number of turbine rotations to the target number of rotations N2 is ended. In step S29, the controller 100 maintains the energized state of the first linear SV 121. Specifically, as indicated by the broken line (the command) in "L-R brake A chamber pressure" in FIG. 9, the controller 100 quickly further increases a current value applied to the first linear SV 121. Consequently, the hydraulic pressure is further supplied to the A chamber 71*a* of the low reverse brake 70, the hydraulic pressure increases to the line pressure, and the fastening of the low reverse brake 70 is completed.

Note that, in FIG. 9, a broken line indicates a command from the controller 100 to the first linear SV 121 and a solid line indicates real pressure supplied to the A chamber 71*a* of the low reverse brake 70.

Second Embodiment

Next, a second embodiment is explained with reference to FIG. 10 to FIG. 13. FIG. 10 to FIG. 13 respectively correspond to FIG. 3, FIG. 4, FIG. 6 or FIG. 8, and FIG. 7 or FIG. 9. Corresponding or similar constituent elements are denoted by the same reference numerals and signs. Explanation of components same as the components in the first embodiment is omitted. Only characteristic portions of the second embodiment are explained.

A difference between the second embodiment and the first embodiment is as explained below. In the first embodiment, the low reverse brake 70 includes the two hydraulic chambers 71*a* and 71*b* and the two pistons 72*a* and 72*b*. On the other hand, in the second embodiment, the low reverse brake 70 includes a single hydraulic chamber and a single piston like the other friction elements.

Figure 10:
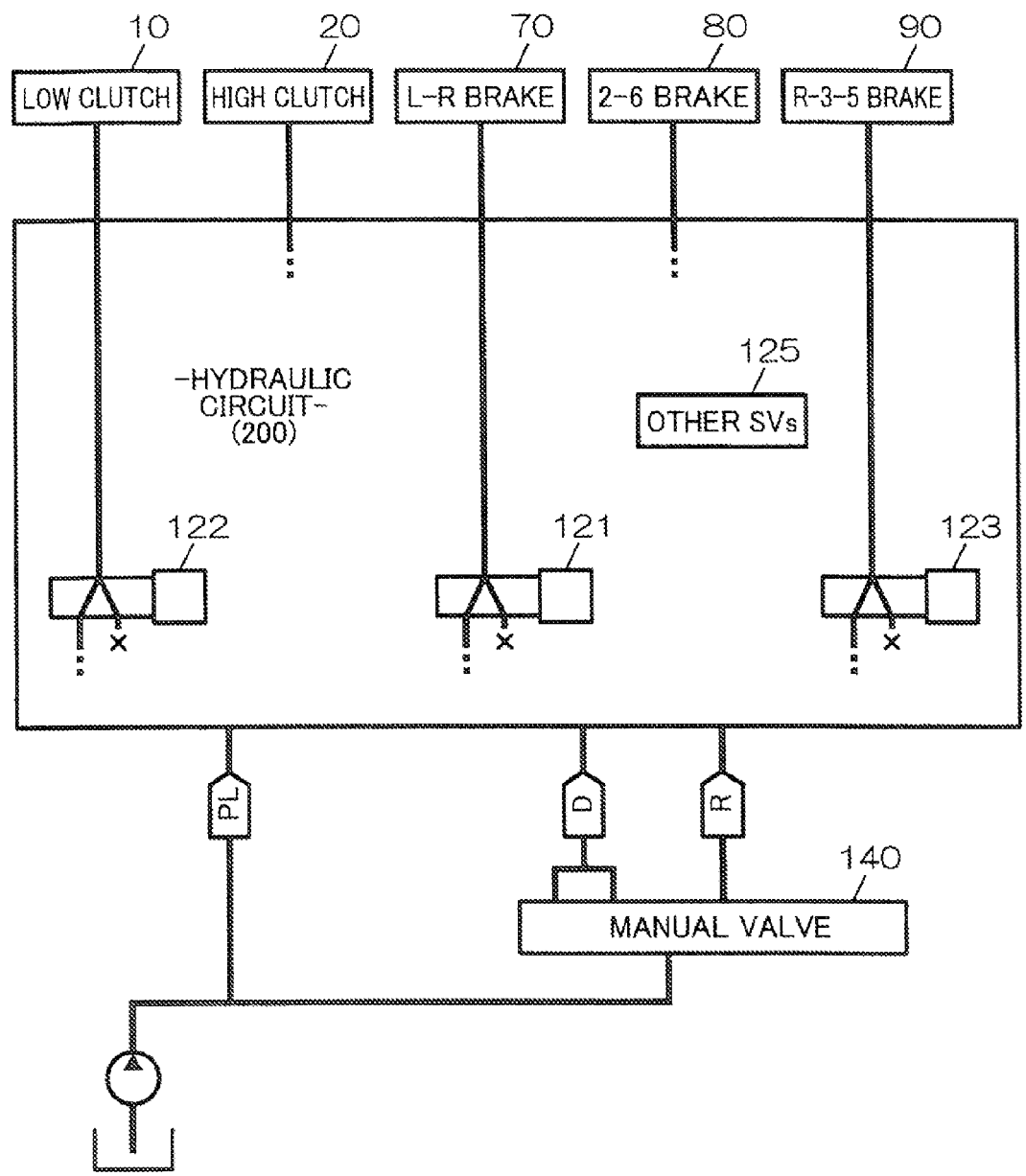
FIG. 10 is a block diagram showing hydraulic routes from an oil pump of an automatic transmission according to a second embodiment of the present invention to friction elements.

That is, as it is evident when FIG. 3 and FIG. 10 are compared, in the second embodiment, the shift valve 130 and the ON/OFF SV 124 are dispensed with and the first linear SV 121 for supplying hydraulic pressure to the hydraulic chamber of the low reverse brake 70 and the low reverse brake 70 are directly connected.

Figure 11:
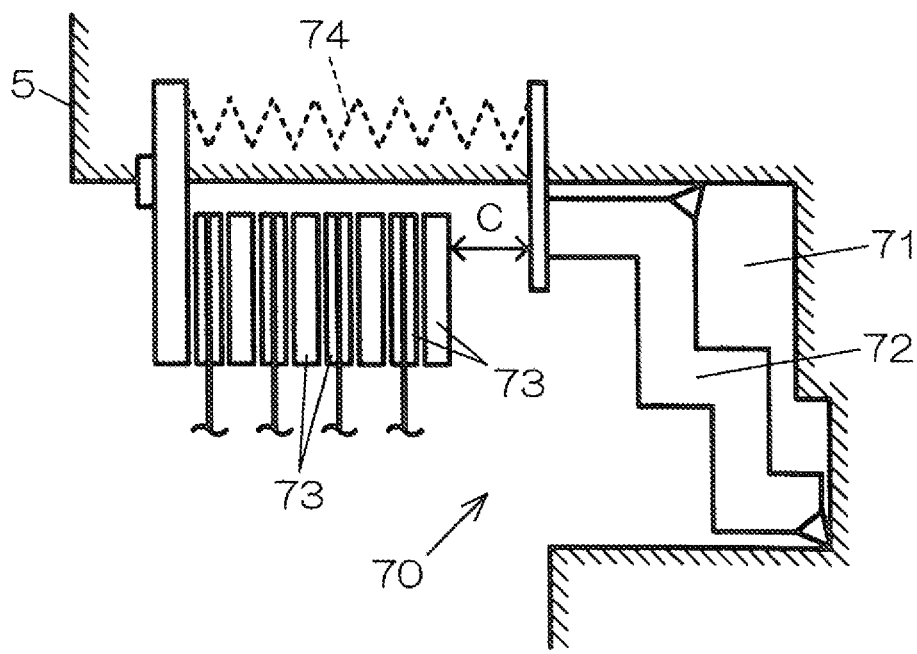
FIG. 11 is a sectional view showing the structure of a low reverse brake of the automatic transmission according to the second embodiment.

As shown in FIG. 11, in the second embodiment, the low reverse brake 70 includes one hydraulic chamber 71 and one piston 72. The piston 72 is configured to be capable of stroking in the transmission case 5 while receiving an urging force of the return spring 74. The piston 72 presses the plurality of friction plates 73 . . . 73.

Hydraulic pressure necessary for moving the piston 72 over a distance C between the piston 72 and the friction plate 73, that is, to a position where there is no clearance is supplied to the hydraulic chamber 71. Hydraulic pressure necessary for generating a pressing force necessary for fastening the low reverse brake 70 is supplied to the hydraulic chamber via the piston 72. Specifically, since hydraulic pressure is supplied to the hydraulic chamber 71, the hydraulic chamber 71 moves the piston 72 resisting an urging force of the return spring 74 from a state in which the low reverse brake 70 is released (a state in which the clearance C is relatively large) to a state in which the low revere brake 70 completes the fastening (a state in which rotation of the friction plate 73 on a side (a driving side) on which the piston 72 is stopped) through a state immediately before fastening is started (a state in which the clearance C is zero, that is, a slip state).

Figure 12:
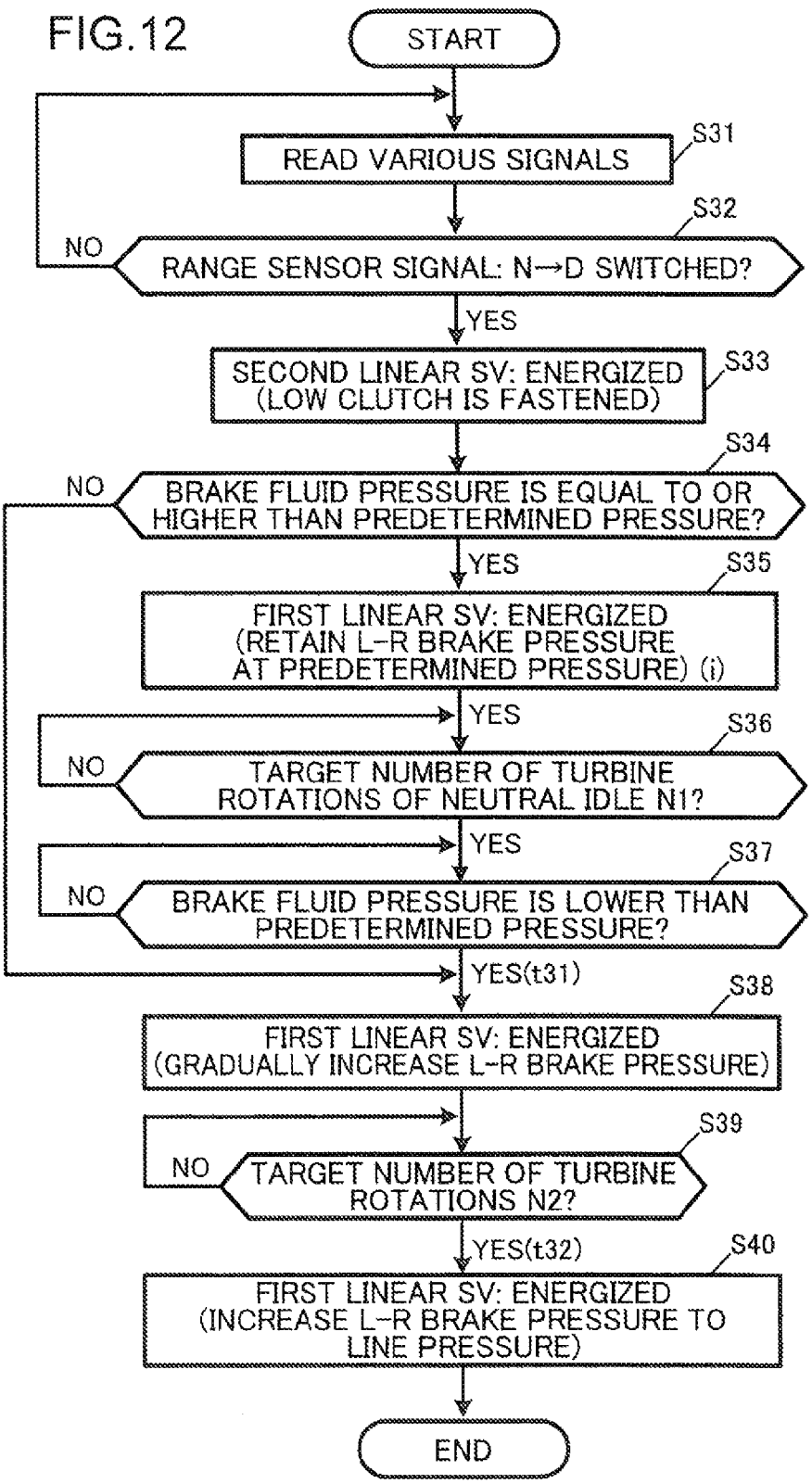
FIG. 12 is a flowchart of a control operation (a third control operation) performed by a controller of the automatic transmission according to the second embodiment.
Figure 13:
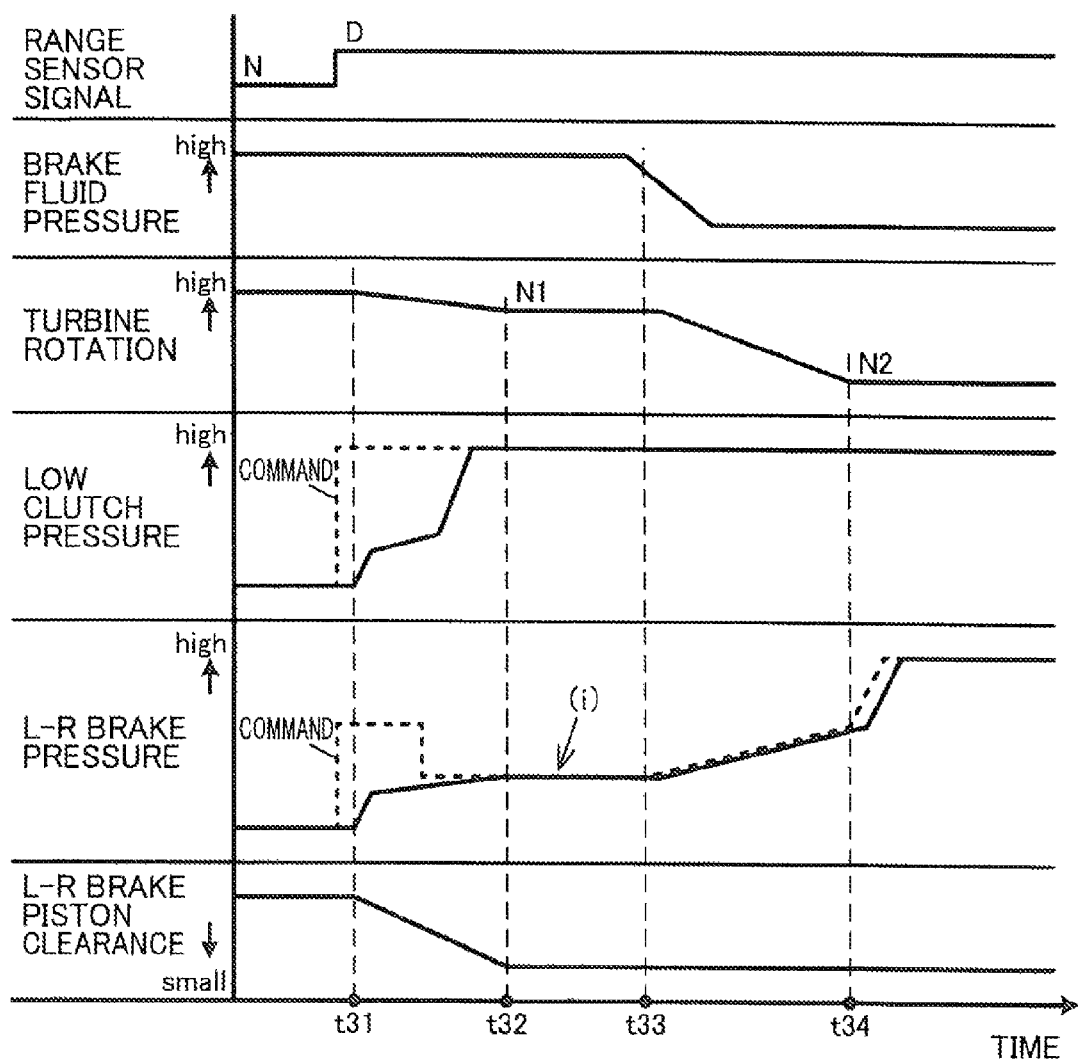
FIG. 13 is a time chart in the case in which the controller according to the second embodiment performs the third control operation.

Next, a control operation (a third control operation) performed by the controller 100 in the second embodiment is explained according to a flowchart shown in FIG. 12 and a time chart shown in FIG. 13. This control operation is a control operation performed when, from a state in which the low clutch 10 and a low reverse brake 70 are released and transmission of power is not performed between the engine side and the wheel side of the transmission mechanisms 30, the low clutch 10 and the low reverse brake 70 are fastened to attain forward first gear speed.

First, this control is started in a state in which the linear SVs 121 to 123 are set in a non-energized state (off) and the low clutch 10 and the low reverse brake 70 are released (see "low clutch pressure" and "L-R brake pressure" in FIG. 13). At this point, since the low reverse brake 70 is released, the distance C between the piston 72 of the low reverse brake 70 and the friction plate 73, that is, clearance is relatively large (see "L-R brake piston clearance" in FIG. 13).

In step S31, the controller 100 reads various signals from the sensor 101 to 103. Thereafter, in step S32, the controller 100 determines according to a signal from the range sensor 101 whether switching from the N range to the D range is performed. As a result, when it is determined YES, in step S33, the controller 100 changes the second linear SV 122 to the energized state. Consequently, the hydraulic pressure (low clutch pressure) is supplied to the hydraulic chamber of the low clutch 10. The low clutch 10 is fastened (finally, the low clutch pressure increases to the line pressure).

Note that, in FIG. 13, a broken line indicates a command from the controller 100 to the second linear SV 122 and a solid line indicates real hydraulic pressure supplied to the hydraulic chamber of the low clutch 10.

Subsequently, in step S34, the controller 100 confirms according to a signal from the brake fluid pressure sensor 102 that brake fluid pressure is equal to or higher than predetermined pressure (a driver does not request starting yet). Then, in step S35, the controller 100 changes the first linear SV 121 to the energized state. Specifically, as indicated by a broken line (a command) in "L-R brake pressure" in FIG. 13, after first instantly increasing a current value applied to the first linear SV 121 of the normal close type, the controller 100 retains the current value at a value lower than the increased value after elapse of a predetermined time. Consequently, after hydraulic pressure (low reverse brake pressure (L-R brake pressure)) is supplied to the hydraulic chamber 71 of the low reverse brake 70 and the fastening of the low reverse brake 70 is started, the hydraulic pressure supplied to the hydraulic chamber 71 of the low reverse brake 70 is retained at predetermined pressure (see sign (i)). The low reverser brake 70 changes to the state immediately before the fastening is started (the state in which the clearance C is zero, that is, the slip state) (see "L-R brake piston clearance" in FIG. 13).

The number of turbine rotations decreases from a rising edge point or the low clutch pressure (or a rising edge point of the low reverse brake pressure) t31 to a start point t32 of retention of the low reverse brake pressure at predetermined pressure. Thereafter, the number of turbine rotations is maintained at the number of turbine rotations N1 during the neutral idle control. That is, the neutral idle control is started at the start point t32 of the retention of the low reverse brake pressure at the predetermined pressure.

Subsequently, in step S36, the controller 100 confirms according to a signal from the turbine rotation sensor 103 that the number of turbine rotations is the target number of turbine rotations N1 during the predetermined neutral idle control. Then, in step S37, the controller 100 determines according to a signal from the brake fluid pressure sensor 102 whether the brake fluid pressure is lower than the predetermined pressure (whether the driver requests starting). As a result, when it is determined YES (a point t33), the neutral idle control is ended. In step S38, the controller 100 maintains the energized state of the first linear SV 121. Specifically, as indicated by the broken line (the command) in "L-R brake pressure" in FIG. 13, the controller 100 gradually increases a current value applied to the first linear SV 121 of the normal close type. Consequently, the hydraulic pressure is gradually supplied to the hydraulic chamber 71 of the low reverse brake 70 and the fastening of the low reverse brake 70 is started. According to the fastening start of the low reverse brake 70, the number of turbine rotations input to the transmission mechanism 30 via the low clutch 10 gradually decreases.

Subsequently, in step S39, the controller 100 determines according to a signal from the turbine rotation sensor 103 whether the number of turbine rotations reaches the predetermined target number of turbine rotations N2. As a result, when it is determined YES (a point t34), the rotation control for the number of turbine rotations for converging the number of turbine rotations to the target number of rotations N2 is ended. In step S40, the controller 100 further maintains the energized state of the first linear SV 121. Specifically, as indicated by the broken line (the command) in the "L-R bake pressure" in FIG. 13, the controller 100 quickly further increases a current value applied to the first linear SV 121. Consequently, the hydraulic pressure is further supplied to the hydraulic chamber 71 of the low reverse brake 70 and increases to the line pressure. The fastening of the low reverse brake 70 is completed.

Note that, in FIG. 13, a broken line indicates a command from the controller 100 to the first linear SV 121 and a solid line indicates real hydraulic pressure supplied to the hydraulic chamber 71 of the low reverse brake 70.

Third Embodiment

Figure 14:
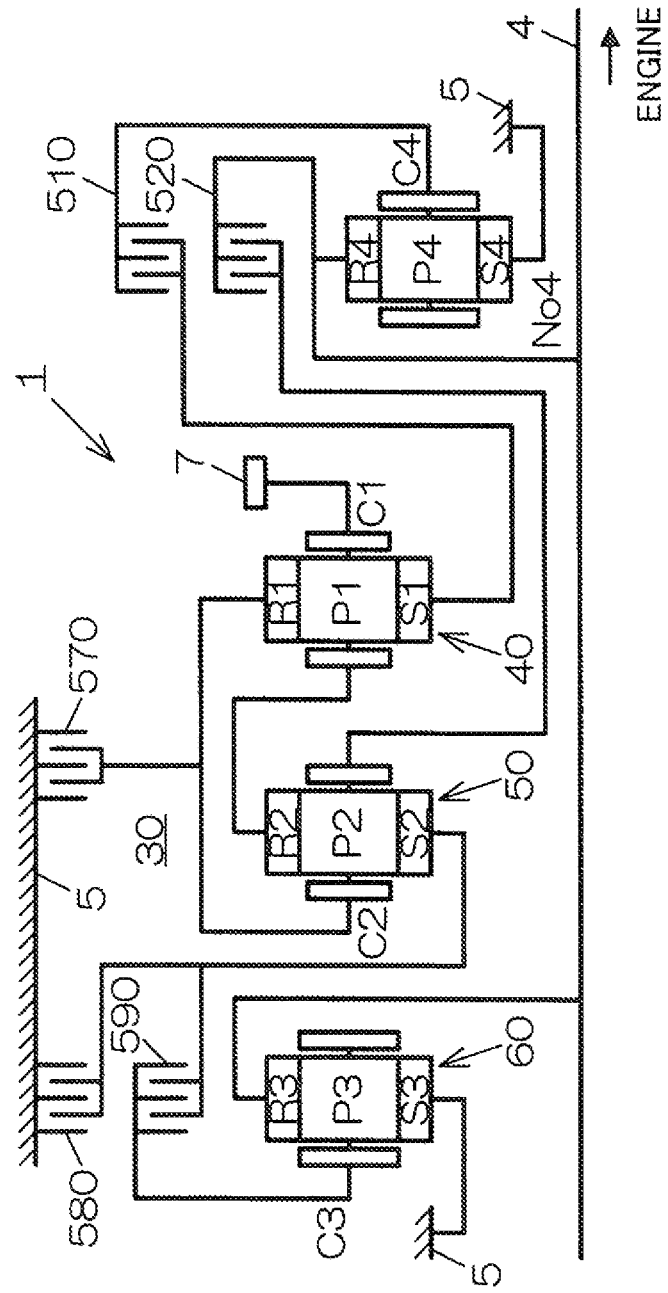
FIG. 14 is a main point diagram of an automatic transmission according to a third embodiment of the present invention.

Next, a third embodiment is explained with reference to FIG. 14 and FIG. 15. FIG. 14 and FIG. 15 respectively correspond to FIG. 1 and FIG. 2. Corresponding or similar constituent elements are denoted by the same reference numerals and signs. Explanation of components same as the components in the first embodiment is omitted. Only characteristic portions of the third embodiment are explained. Note that, in a fastening table in FIG. 15, "M1 speed" indicates forward first gear speed in a manual range and "D1 speed" indicates forward first gear speed in an auto range.

A difference between the third embodiment and the first embodiment is as explained below. In the first embodiment, the reverse speed is attained by the fastening of the low reverse brake 70 and the R-3-5 brake 90. On the other hand, in the third embodiment, the reverse speed is attained by fastening of a low reverse brake 570 and an R-3-5 clutch 590. That is, in the third embodiment, not only the forward first gear speed (in particular, the M1 speed) but also the reverse speed is attained by fastening a predetermined clutch element and a predetermined brake element. Therefore, a control operation in fastening the R-3-5 clutch 590 and the low reverse brake 570 and attaining the reverse speed from a state in which the R-3-5 clutch 590 and the low reverse brake 570 are released and transmission of power is not performed between the engine side and the wheel side of the transmission mechanism 30 can be performed in the same manner according to the first control operation explained with reference to FIG. 6 and FIG. 7, a second control operation explained with reference to FIG. 8 and FIG. 9, and a third control operation explained with reference to FIG. 12 and FIG. 13. In that case, the range sensor signal in steps S13, S23, and S32 reads "N→R switched?", the second linear SV in steps S14, S24, and S33 reads "third linear SV", and the low clutch fastening reads "R-3-5 clutch fastening". A hydraulic control valve that supplies the hydraulic pressure to the hydraulic chamber of the R-3-5 clutch 590 is the third linear SV 123.

Steps S13, S23, and S32 executed by the controller 100 are a command detecting step (a step of detecting a starting gear shift stage attainment command) in claims. Steps S14, S24, and S33 are a clutch element fastening step (a step of supplying, when the starting gear shift stage attainment command is detected in the command detecting step, the hydraulic pressure to the clutch element to thereby fasten the clutch element). Steps S16 to S17, S27 to S28, and S38 to S39 are a rotation control step (a step of supplying, after the clutch element fastening step, the hydraulic pressure to the brake element to thereby start fastening of the brake element and controlling rotation input to the transmission mechanism via the clutch element to a target number of rotations). The repetition of steps S15, S26, and S37 is a slip state maintaining step (a step of maintaining, before the rotation control step, in a period in which a stepping amount of a brake pedal is equal to or larger than a predetermined amount, the brake element in a slip state). Steps S12 and S25 are a first hydraulic pressure supply step (a step of supplying, before the starting gear shift stage attainment command is detected in the command detecting step or after the starting gear shift stage attainment command is detected in the command detecting step and before the rotation control step, the hydraulic pressure to the first hydraulic chamber of the brake element to thereby change the brake element to a state immediately before fastening start (the slip state)).

Further, steps S18, S29, and S40 is a brake element fastening completing step of further supplying, after the rotation control step, the hydraulic pressure to the brake element to thereby complete the fastening of the brake element.

The controller 100 that executes steps S13, S23, and S32 is command detecting means (means for detecting a starting gear shift stage attainment command) in claims. The controller 100 that executes steps S14, S24, and S33 is clutch element fastening means (means for supplying, when the starting gear shift stage attainment command is detected, the hydraulic pressure to the clutch element to thereby fasten the clutch element). The controller 100 that executes steps S16 to S17, S27 to S28, and S38 to S39 is rotation control means (means for supplying, after the operation of the clutch element fastening means, the hydraulic pressure to the brake element to thereby start fastening of the brake element and controlling rotation input to the transmission mechanism via the clutch element to a target number of rotations).

The controller 100 that executes steps S18, S29, and S40 is brake element fastening completing means for further supplying, after the operation of the rotation control means, the hydraulic pressure to the brake element to thereby complete the fastening of the brake element.

As it is evident when FIG. 1 and FIG. 14 are compared, in the third embodiment, a fourth PGS (denoted by a sign No 4) for speed reduction is disposed in the low clutch 510 and the high clutch 520. A sun gear S4 of the fourth PGS and a sun gear S3 of the third PGS 60 are fixed to the transmission case 5. The R-3-5 clutch 590 disconnectably couple a sun gear S2 of the second PGS 50 and a pinion carrier C3 of the third PGS 60. The third PGS 60 is a single pinion PGS. A coupling relation among the constituent elements is as shown in the figure. Therefore, explanation of the coupling relation is omitted. However, sign 51 denotes a sun gear of the first PGS 40, signs C1, C2, and C4 denote pinion carriers of the first PGS 40, the second PGS 50, and the fourth PGS, signs P1, P2, P3, and P4 denote pinions of the first PGS 40, the second PGS 50, the third PGS 60, and the fourth PGS, and signs R1, R2, R3, and R4 denote ring gears of the first PGS 40, the second PGS 50, the third PGS 60, and the fourth PGS.

As explained above, in the automatic transmission 1 according to the third embodiment, the transmission mechanism 30 includes the four PGSs 40, 50, 60, and No 4, the three clutches 510, 520, and 590, and the two brakes 570 and 580. The clutches 510, 520, and 590 and the brakes 570 and 580 are selectively fastened, whereby power transmission routes of the PGSs 40, 50, 60 and No 4 are switched and the forward six stages (the forward first gear speed includes two kinds: "M1 speed" and "D1 speed") and the reverse speed are attained.

Features of these embodiments are summarized below. In the following explanation, the starting gear shift stage is the forward first gear speed. When the starting gear shift stage is the reverse speed, explanation is similar to the explanation in the case of the forward first gear speed. Therefore, the explanation is omitted.

In these embodiments, when the starting gear shift stage attainment command is detected, the low reverse brake 70 or 570 and the low clutch 10 or 510 are fastened, whereby the forward first gear speed is attained. Therefore, a one-way clutch for attaining the forward first gear speed can be dispensed with. Increases in the cost, the weight, and the size of the automatic transmission 1 are avoided. Occurrence of drag resistance and deterioration in fuel efficiency caused when the one-way clutch idles without being locked are eliminated.

Moreover, from a state in which the low clutch 10 or 510 and the low reverse brake 70 or 570 are released and transmission of power is not performed between the engine side and the wheel side of the transmission mechanism 30, first, the low clutch 10 or 510 is fastened. Therefore, the transmission of power does not start yet even if the low clutch 10 or 510 is fastened. Therefore, even if it is difficult to precisely control timing of the fastening of the low clutch 10 or 510 because of the influence of centrifugal hydraulic pressure, an unpleasant shock does not occur.

After the fastening of the low clutch 10 or 510, fastening of the low reverse brake 70 or 570 in which centrifugal hydraulic pressure does not occur is started, whereby the number of turbine rotations is controlled to the target number of turbine rotations N2. Therefore, it is possible to accurately and precisely perform the rotation control of the number of turbine rotations without taking into account the influence of the centrifugal hydraulic pressure. It is possible to fasten the low reverse brake 70 or 570 at appropriate timing without a shock. Therefore, it is possible to satisfactorily attain even the forward first gear speed having a large reduction ratio without a shock while dispensing with the one-way clutch.

In these embodiments, before the rotation control step (steps S16 to S17, S27 to S28, and S38 to S39), the low revere brake 70 or 570 is maintained in the slip state (repetition of steps S15, S26, and S37) in a period in which the brake fluid pressure reflecting the stepping amount of the brake pedal is equal to or higher than the predetermined pressure (a period in which a driver has yet made a starting request). That is, the neutral idle control is performed by maintaining the low reverse brake 70 or 570, in which centrifugal hydraulic force does not occur, in the slip state. Therefore, it is possible to accurately and precisely perform the neutral idle control without taking into account the influence of the centrifugal hydraulic pressure.

In these embodiments, when the brake fluid pressure reflecting the stepping amount of the brake pedal is lower than the predetermined pressure (when the driver requests starting), the rotation control step (steps S16 to S17, S27 to S28, and S38 to S39) is started. Therefore, it is possible to quickly fasten the low reverse brake 70 or 570 from the slip state with high responsiveness to the starting request of the driver and attain the forward first gear speed. In that case, as explained above, since centrifugal hydraulic pressure does not occur in the low reverse brake 70 or 570, it is possible to accurately and precisely perform the rotation control without taking into account the influence of the centrifugal hydraulic pressure. It is possible to satisfactorily attain the forward first gear speed without a shock.

In these embodiments, the low reverse brake 70 or 570 includes the B chamber 71b that moves the piston (the piston for the B chamber) 72b resisting the urging force of the return spring 74 from the state in which the low reverse brake 70 or 570 is released to the state immediately before the low reverse brake 70 or 570 starts fastening and the A chamber 71a that moves the other piston (the piston for the A chamber) 72a without resisting the urging force of the return spring from the state immediately before the low reverse brake 70 or 570 starts the fastening to the state in which the low reverse brake 70 or 570 completes the fastening.

In the first control operation shown in FIG. 6, the first hydraulic pressure supply step (step S12) for supplying, before the starting gear shift stage attainment command is detected in the command detecting step (step S13), the hydraulic pressure to the B chamber 71b to thereby change the low reverse brake 70 or 570 to the state immediately before starting fastening (the slip state) is performed. In the rotation control step (step S16 to S17) and the brake element fastening completing step (step S18), by supplying the hydraulic pressure to the A chamber 71a, the fastening of the low revere brake 70 or 570 is started and the low reveres brake 70 or 570 is changed to a fastening completed state.

Consequently, before the starting gear shift stage attainment command is detected, by supplying the hydraulic pressure to the B chamber 71b of the low reverse brake 70, the low reverse brake 70 is changed to the state immediately before starting fastening. After the starting gear shift stage attainment command is detected, by supplying the hydraulic pressure to the A chamber 71a of the low reverse brake 70, the fastening of the low reverse brake 70 is started and the low reverse brake 70 is changed to the fastening completed state. Therefore, it is possible to secure satisfactory starting excellent in responsiveness to the starting gear shift stage attainment command.

Figure 8:
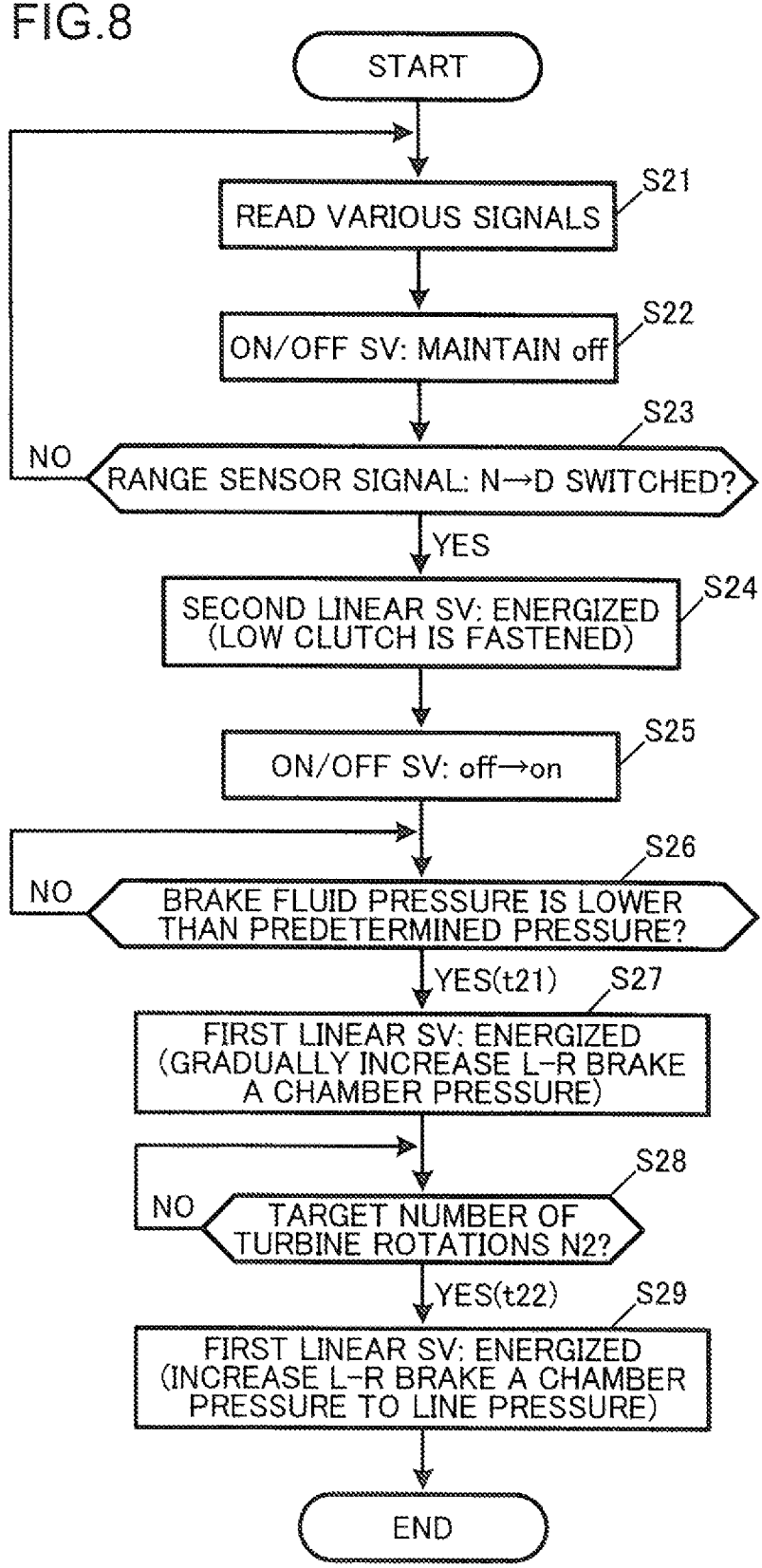
FIG. 8 is a flowchart of another control operation (a second control operation) performed by the controller of the automatic transmission.

On the other hand, in the second control operation shown in FIG. 8, the first hydraulic pressure supply step (step S25) for supplying, after the starting gear shift stage attainment command is detected in the command detecting step (step S23), before the rotation control step (steps S27 to S28), the hydraulic pressure to the B chamber 71b to thereby change the low reverse brake 70 or 570 to the state immediately before starting fastening (the slip state) is performed. In the rotation control step (step S27 to S28) and the brake element fastening completing step (step S29), by supplying the hydraulic pressure to the A chamber 71a, the fastening of the low revere brake 70 or 570 is started and the low reveres brake 70 or 570 is changed to a fastening completed state.

Consequently, after the starting gear shift stage attainment command is detected, by supplying the hydraulic pressure to the B chamber 71b of the low reverse brake 70, the low reverse brake 70 is changed to the state immediately before starting fastening. Subsequently, by supplying the hydraulic pressure to the A chamber 71a of the low reverse brake 70, the fastening of the low reverse brake 70 is started. Therefore, before the starting gear shift stage attainment command is detected, the hydraulic pressure does not have to be supplied to the B chamber 71b of the low reverse brake 70. Therefore, compared with when the hydraulic pressure is supplied to the B chamber 71b before the starting gear shift stage attainment command is detected, leak of the hydraulic pressure from the hydraulic circuit 200 leading to the B chamber 71b is reduced or eliminated. Therefore, it is possible to reduce a discharge amount of the oil pump driven by the engine and reduce the number of idle rotations of the engine. As a result, it is possible to improve fuel efficiency in the idle state before the starting gear shift stage attainment command is detected.

In both the cases, it is possible to accurately and precisely perform the rotation control step (steps S16 to S17 and steps S27 to S28) and the brake element fastening completing step (step S18 and step S29) without taking into account the urging force of the return spring 74. Consequently, it is possible to more satisfactorily attain the forward first gear speed without a shock.

Note that, in the embodiment, in the low clutch 10, a balance chamber for offsetting centrifugal hydraulic pressure is not provided besides the normal hydraulic chamber. However, the balance chamber may be provided. When the balance chamber is not provided, compared with when the balance chamber is provided, increases in the cost, the weight, and the size of the automatic transmission 1 are suppressed. It is advantageous in this regard not to provide the balance chamber.

The present invention explained above is summarized below.

That is, the present invention is a control method for an automatic transmission including a plurality of friction elements that change a power transmission route of a transmission mechanism according to an operation state, a starting gear shift stage being attained by fastening a predetermined brake element and a predetermined clutch element among the friction elements, the control method comprising: a command detecting step of detecting a command for, from a state in which the clutch element and the brake element are released and in which transmission of power is not performed between an engine side and a wheel side of the transmission mechanism, fastening the friction elements to attain the starting gear shift stage (hereinafter referred to as "starting gear shift stage attainment command"); a clutch element fastening step of supplying, when the command is detected in the command detecting step, hydraulic pressure to the clutch elements thereby fastening the clutch elements; and a rotation control step of supplying, after the clutch element fastening step, the hydraulic pressure to the brake elements thereby starting the fastening of the brake elements and controlling rotation, which is input to the transmission mechanism via the clutch elements, to a target number of rotations.

According to the present invention, first, when the starting gear shift stage attainment command is detected, the forward gear shift stage is attained by fastening the predetermined brake element and the predetermined clutch element. Therefore, it is possible to dispense with a one-way clutch for attaining the starting gear shift stage. Increases in the cost, the weight, and the size of the automatic transmission are avoided. Occurrence of drag resistance and deterioration in fuel efficiency caused when the one-way clutch idles without being locked are eliminated.

Moreover, from a state in which the clutch element and the brake element are released and transmission of power is not performed between the engine side and the wheel side of the transmission mechanism, first, the clutch element is fastened. Therefore, the transmission of power does not start yet even if the clutch element is fastened. Therefore, even if it is difficult to precisely control timing of the fastening of the clutch element because of the influence of centrifugal hydraulic pressure, an unpleasant shock does not occur.

After the fastening of the clutch element, fastening of the brake element in which centrifugal hydraulic pressure does not occur is started, whereby rotation input to the transmission mechanism via the clutch element is controlled to the target number of rotations. Therefore, it is possible to accurately and precisely perform the rotation control without taking into account the influence of the centrifugal hydraulic pressure. It is possible to fasten the brake element at appropriate timing without a shock. Therefore, it is possible to satisfactorily attain even the forward gear shift stage having a large reduction ratio without a shock while dispensing with the one-way clutch.

In the present invention, it is preferable that the control method includes a slip state maintaining step of maintaining, before the rotation control step, in a period in which a stepping amount of a brake pedal is equal to or larger than a predetermined amount, the brake element in a slip state.

With this configuration, neutral idle control (control for maintaining at least one of the friction elements, which attain the starting gear shift stage, in the slip state to thereby reduce a load on the engine and attain improvement of fuel efficiency in a period in which a driver selects the D range or the R range but does not request starting yet (e.g., a stepping amount of the brake pedal is equal to or larger than a predetermined amount); the same applies below) is performed by maintaining the brake element, in which centrifugal hydraulic pressure does not occur, in the slip state. Therefore, it is possible to accurately and precisely perform the neutral idle control without taking into account the influence of the centrifugal hydraulic pressure.

In the present invention, it is preferable that the rotation control step is started when the stepping amount of the brake pedal is smaller than the predetermined amount.

With this configuration, it is possible to quickly fasten the brake element from the slip state with high responsiveness to the starting request of the driver (e.g., stepping amount of the brake pedal is smaller than the predetermined amount) and attain the starting gear shift stage. In that case, as explained above, since centrifugal hydraulic pressure does not occur in the brake element, it is possible to accurately and precisely perform the rotation control without taking into account the influence of the centrifugal hydraulic pressure. It is possible to satisfactorily attain the starting gear shift stage without a shock.

In the present invention, it is preferable that the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening, the control method includes a first hydraulic pressure supply step of supplying, before the command is detected in the command detecting step, the hydraulic pressure to the first hydraulic chamber thereby changing the brake element to the state immediately before starting fastening, and, in the rotation control step, by supplying the hydraulic pressure to the second hydraulic chamber, the fastening of the brake element is started.

With this configuration, before the starting gear shift stage attainment command is detected, by supplying the hydraulic pressure to the first hydraulic chamber of the brake element, the brake element is changed to the state immediately before starting fastening. After the starting gear shift stage attainment command is detected, by supplying the hydraulic pressure to the second hydraulic chamber of the brake element, the fastening of the brake element is started. Therefore, it is possible to secure satisfactory starting excellent in responsiveness to the starting gear shift stage attainment command.

In the present invention, it is preferable that the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening, the control method includes a first hydraulic pressure supply step of supplying, after the command is detected in the command detecting step, before the rotation control step, the hydraulic pressure to the first hydraulic chamber thereby changing the brake element to the state immediately before starting fastening, and, in the rotation control step, by supplying the hydraulic pressure to the second hydraulic chamber, the fastening of the brake element is started.

With this configuration, after the starting gear shift stage attainment command is detected, by supplying the hydraulic pressure to the first hydraulic pressure chamber of the brake element, the brake element is changed to the state immediately before starting fastening. Subsequently, by supplying the hydraulic pressure to the second hydraulic chamber of the brake element, the fastening of the brake element is started. Therefore, before the starting gear shift stage attainment command is detected, the hydraulic pressure does not have to be supplied to the first hydraulic chamber of the brake element. Therefore, compared with when the hydraulic pressure is supplied to the first hydraulic chamber before the starting gear shift stage attainment command is detected, leak of the hydraulic pressure from a hydraulic circuit leading to the first hydraulic chamber is reduced or eliminated. Therefore, it is possible to reduce a discharge amount of the oil pump driven by the engine and reduce the number of idle rotations of the engine. As a result, it is possible to improve fuel efficiency in the idle state before the starting gear shift stage attainment command is detected.

In the present invention, it is preferable that the first hydraulic chamber is configured to move the piston resisting an urging force of a return spring, and the second hydraulic chamber is configured to move the piston without resisting the urging force of the return spring.

With this configuration, it is possible to accurately and precisely perform the rotation control step without taking into account the urging force of the return spring. Consequently, it is possible to more satisfactorily attain the starting gear shift stage without a shock.

The present invention is a control device for an automatic transmission including a plurality of friction elements that change a power transmission route of a transmission mechanism according to an operation state, a starting gear shift stage being attained by fastening a predetermined brake element and a predetermined clutch element among the friction elements, the control device including: command detecting means for detecting a command for, from a state in which the clutch element and the brake element are released and in which transmission of power is not performed between an engine side and a wheel side of the transmission mechanism, fastening the friction elements to attain the starting gear shift stage; clutch element fastening means for supplying, when the command is detected by the command detecting means, hydraulic pressure to the clutch elements thereby fastening the clutch elements; and rotation control means for supplying, after the operation of the clutch element fastening means, the hydraulic pressure to the brake elements thereby starting the fastening of the brake elements and controlling rotation, which is input to the transmission mechanism via the clutch elements, to a target number of rotations.

According to the present invention, action same as the action of the control method for the automatic transmission explained above is obtained.

The present invention is an automatic transmission system including: a plurality of friction elements that change a power transmission route of a transmission mechanism according to an operation state; a predetermined brake element and a predetermined clutch element fastened to attain a starting gear shift stage among the friction elements; a hydraulic actuator that drives the friction elements; a hydraulic circuit including a hydraulic control valve that controls hydraulic pressure to the hydraulic actuator; and a controller that controls the hydraulic control valve, wherein the controller is configured to detect a command for, from a state in which the clutch element and the brake element are released and in which transmission of power is not performed between an engine side and a wheel side of the transmission mechanism, fastening the friction elements to attain the starting gear shift stage, control, when detecting the command, the hydraulic control valve to supply hydraulic pressure to the hydraulic actuator for the clutch elements thereby fastening the clutch elements, and then control the hydraulic control valve to supply the hydraulic pressure to the hydraulic actuator for the brake elements thereby starting the fastening of the brake elements and control rotation, which is input to the transmission mechanism via the clutch elements, to a target number of rotations.

According to the present invention, action same as the action of the control method for the automatic transmission explained above is obtained.

This application is based on Japanese Patent Application No. 2012-097744 filed on Apr. 23, 2012, the contents of which are incorporated in this application.

To represent the present invention, the present invention is appropriately and sufficiently explained above through the embodiments with reference to the drawings. However, it should be noted that those skilled in the art could easily change and/or improve the embodiments. Therefore, unless a changed form or an improved form implemented by those skilled in the art is of a level departing from the scope of the right of claims described in the scope of claims, such a changed form or an improved form is interpreted as being included in the scope of the right of claims described in the scope of claims.

INDUSTRIAL APPLICABILITY

As explained above, the present invention has industrial applicability in the technical field of an automatic transmission for a vehicle.

The invention claimed is:

1. A control method for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch, the control method comprising:
a command detecting step of detecting a command for, from a state in which the clutch element and the brake element are released and in which transmission of power is not performed between an engine side and a wheel side of the transmission mechanism, fastening the friction elements to attain the starting gear shift stage;
a clutch element fastening step of supplying, when the command is detected in the command detecting step, hydraulic pressure to the clutch elements thereby fastening the clutch elements; and
a rotation control step of supplying, after the clutch element fastening step, the hydraulic pressure to the brake elements thereby starting the fastening of the brake elements and controlling rotation which is input to the transmission mechanism via the clutch elements.

2. The control method for an automatic transmission according to claim 1, wherein
in the rotation control step, by supplying the hydraulic pressure to the brake elements when the rotation input to the transmission mechanism via the clutch elements is larger than a given value, the fastening of the brake elements is started and the rotation decreases to the given value.

3. The control method for an automatic transmission according to claim 2, wherein
in the rotation control step, by supplying the hydraulic pressure to the brake elements when the rotation input to the transmission mechanism via the clutch elements is larger than a target number of rotations, the fastening of the brake elements is started and the rotation decreases to the target number of rotations.

4. The control method for an automatic transmission according to claim 3, further comprising a slip state maintaining step of maintaining, before the rotation control step, in a period in which a stepping amount of a brake pedal is equal to or larger than a predetermined amount, the brake element in a slip state.

5. The control method for an automatic transmission according to claim 4, wherein the rotation control step is started when the stepping amount of the brake pedal is smaller than the predetermined amount.

6. The control method for an automatic transmission according to claim 5, wherein
the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening,
the control method further comprising:
a first hydraulic pressure supply step of supplying, before the command is detected in the command detecting step, the hydraulic pressure to the first hydraulic chamber thereby changing the brake element to the state immediately before starting fastening, wherein
in the rotation control step, by supplying the hydraulic pressure to the second hydraulic chamber, the fastening of the brake element is started.

7. The control method for an automatic transmission according to claim 6, wherein the first hydraulic chamber is configured to move the piston resisting an urging force of a return spring, and the second hydraulic chamber is configured to move the piston without resisting the urging force of the return spring.

8. The control method for an automatic transmission according to claim 5, wherein
the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening,
the control method further comprising:
a first hydraulic pressure supply step of supplying, after the command is detected in the command detecting step, before the rotation control step, the hydraulic pressure to the first hydraulic chamber thereby changing the brake element to the state immediately before starting fastening, wherein
in the rotation control step, by supplying the hydraulic pressure to the second hydraulic chamber, the fastening of the brake element is started.

9. The control method for an automatic transmission according to claim 8, wherein the first hydraulic chamber is configured to move the piston resisting an urging force of a return spring, and the second hydraulic chamber is configured to move the piston without resisting the urging force of the return spring.

10. The control method for an automatic transmission according to claim 1, further comprising a slip state maintaining step of maintaining, before the rotation control step, in a period in which a stepping amount of a brake pedal is equal to or larger than a predetermined amount, the brake element in a slip state.

11. The control method for an automatic transmission according to claim 10, wherein the rotation control step is started when the stepping amount of the brake pedal is smaller than the predetermined amount.

12. The control method for an automatic transmission according to claim 11, wherein
the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening,
the control method further comprising:
a first hydraulic pressure supply step of supplying, before the command is detected in the command detecting step, the hydraulic pressure to the first hydraulic chamber thereby changing the brake element to the state immediately before starting fastening, wherein
in the rotation control step, by supplying the hydraulic pressure to the second hydraulic chamber, the fastening of the brake element is started.

13. The control method for an automatic transmission according to claim 12, wherein the first hydraulic chamber is configured to move the piston resisting an urging force of a return spring, and the second hydraulic chamber is configured to move the piston without resisting the urging force of the return spring.

14. The control method for an automatic transmission according to claim 11, wherein
the brake element includes a first hydraulic chamber that moves a piston from a state in which the brake element is released to a state immediately before the brake element starts fastening, and a second hydraulic chamber that moves another piston from the state immediately before the brake element starts the fastening to a state in which the brake element completes the fastening,
the control method further comprising:
a first hydraulic pressure supply step of supplying, after the command is detected in the command detecting step, before the rotation control step, the hydraulic pressure to the first hydraulic chamber thereby changing the brake element to the state immediately before starting fastening, wherein
in the rotation control step, by supplying the hydraulic pressure to the second hydraulic chamber, the fastening of the brake element is started.

15. The control method for an automatic transmission according to claim 14, wherein the first hydraulic chamber is configured to move the piston resisting an urging force of a return spring, and the second hydraulic chamber is configured to move the piston without resisting the urging force of the return spring.

16. A control device for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch,
the control device comprising:
a command detecting unit for detecting a command for, from a state in which the clutch element and the brake element are released and in which transmission of power is not performed between an engine side and a wheel side of the transmission mechanism, fastening the friction elements to attain the starting gear shift stage;
a clutch element fastening unit for supplying, when the command is detected by the command detecting unit, hydraulic pressure to the clutch elements thereby fastening the clutch elements; and
a rotation control unit for supplying, after the operation of the clutch element fastening unit, the hydraulic pressure to the brake elements thereby starting the fastening of the brake elements and controlling rotation which is input to the transmission mechanism via the clutch elements.

17. A control device for an automatic transmission including a plurality of friction elements that change a power transmission route of a transmission mechanism according to an operation state, a starting gear shift stage being attained by fastening a predetermined brake element and a predetermined clutch element among the friction elements, with automatic transmission not being provided with a one-way clutch,
the control device comprising:
a command detecting unit for detecting a command for, from a state in which the clutch element and the brake element are released and in which transmission of power is not performed between an engine side and a wheel side of the transmission mechanism, fastening the friction elements to attain the starting gear shift stage;
a clutch element fastening unit for supplying, when the command is detected by the command detecting unit, hydraulic pressure to the clutch elements thereby fastening the clutch elements; and
a brake element fastening unit for supplying, after the operation of the clutch element fastening unit, the hydraulic pressure to the brake elements thereby starting the fastening of the brake elements.

* * * * *